(12) United States Patent
Weikel et al.

(10) Patent No.: US 12,187,022 B2
(45) Date of Patent: Jan. 7, 2025

(54) COLD-FORMED CURVED GLASS ARTICLES AND METHODS OF MAKING THE SAME

(71) Applicant: CORNING INCORPORATED, Corning, NY (US)

(72) Inventors: Arlin Lee Weikel, Mansfield, PA (US); Po Ki Yuen, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 491 days.

(21) Appl. No.: 17/263,378

(22) PCT Filed: Jul. 24, 2019

(86) PCT No.: PCT/US2019/043187
§ 371 (c)(1),
(2) Date: Jan. 26, 2021

(87) PCT Pub. No.: WO2020/023606
PCT Pub. Date: Jan. 30, 2020

(65) Prior Publication Data
US 2021/0323270 A1    Oct. 21, 2021

Related U.S. Application Data

(60) Provisional application No. 62/703,520, filed on Jul. 26, 2018.

(51) Int. Cl.
*B32B 7/12* (2006.01)
*B32B 3/26* (2006.01)
(Continued)

(52) U.S. Cl.
CPC .................. *B32B 7/12* (2013.01); *B32B 3/26* (2013.01); *B32B 17/06* (2013.01); *B32B 37/12* (2013.01);
(Continued)

(58) Field of Classification Search
CPC .. B32B 7/12; B32B 3/26; B32B 17/06; B32B 17/18; B32B 2307/412; B32B 2315/08;
(Continued)

(56) References Cited

U.S. PATENT DOCUMENTS 4,035,065 A    7/1977   Fletcher et al.
4,455,338 A    6/1984   Henne
(Continued)

FOREIGN PATENT DOCUMENTS

CN    101684032 A    3/2010
CN    102566841 A    7/2012
(Continued)

OTHER PUBLICATIONS

Belis et al., "Cold bending of laminated glass panels", Heron, vol. 52, 2007, pp. 123-146.
(Continued)

*Primary Examiner* — Michael Zhang
(74) *Attorney, Agent, or Firm* — William M. Johnson; Frank Brock Riggs; Payal A. Patel

(57) ABSTRACT

Embodiments of a vehicle interior component and methods of forming the same are disclosed. The vehicle interior component includes a frame with a support surface and having an opening formed in the support surface. A glass substrate is provided that includes a first major surface, a second major surface facing the support surface, and a minor surface between the first and second major surfaces and defining a thickness of the glass substrate. An adhesive at least partially fills the opening and adheres the glass substrate to the frame. The adhesive in the opening acts to secure the glass substrate and adhesive to the frame.

14 Claims, 15 Drawing Sheets

(51) Int. Cl.
| | |
|---|---|
| B32B 17/06 | (2006.01) |
| B32B 37/12 | (2006.01) |
| B32B 37/18 | (2006.01) |
| B60K 35/00 | (2024.01) |
| B60K 35/10 | (2024.01) |
| C03B 23/03 | (2006.01) |
| C03C 21/00 | (2006.01) |
| C03C 27/10 | (2006.01) |
| C09J 5/06 | (2006.01) |
| C09J 183/04 | (2006.01) |

(52) U.S. Cl.
CPC .............. *B32B 37/18* (2013.01); *B60K 35/00* (2013.01); *B60K 35/10* (2024.01); *C03B 23/0305* (2013.01); *C03C 21/002* (2013.01); *C03C 27/10* (2013.01); *C09J 5/06* (2013.01); *C09J 183/04* (2013.01); *B32B 2307/412* (2013.01); *B32B 2315/08* (2013.01); *B32B 2457/20* (2013.01); *B32B 2605/08* (2013.01); *B60K 2360/1434* (2024.01); *C09J 2483/00* (2013.01)

(58) Field of Classification Search
CPC . B32B 2457/20; B32B 2605/08; B60K 35/00; B60K 37/06; B60K 2370/1434; C03B 23/0305; C03C 21/002; C03C 27/10; C09J 5/06; C09J 183/04; C09J 2483/00
See application file for complete search history.

(56) References Cited

U.S. PATENT DOCUMENTS

| | | | |
|---|---|---|---|
| 4,899,507 A | 2/1990 | Mairlot | |
| 4,985,099 A | 1/1991 | Mertens et al. | |
| 6,086,983 A | 7/2000 | Yoshizawa | |
| 6,332,690 B1 | 12/2001 | Murofushi | |
| 6,582,799 B1 | 6/2003 | Brown et al. | |
| 7,375,782 B2 | 5/2008 | Yamazaki et al. | |
| 8,344,369 B2 | 1/2013 | Yamazaki et al. | |
| 8,549,885 B2 | 10/2013 | Dannoux et al. | |
| 8,833,106 B2 | 9/2014 | Dannoux et al. | |
| 8,912,447 B2 | 12/2014 | Leong et al. | |
| 9,061,934 B2 | 6/2015 | Bisson et al. | |
| 9,593,042 B2 | 3/2017 | Hu et al. | |
| 9,802,485 B2 | 10/2017 | Masuda et al. | |
| 9,895,975 B2 | 2/2018 | Lee et al. | |
| 9,902,640 B2 | 2/2018 | Dannoux et al. | |
| 9,931,817 B2 | 4/2018 | Rickerl | |
| 10,131,118 B2 | 11/2018 | Kang et al. | |
| 2007/0223121 A1 | 9/2007 | Franck et al. | |
| 2009/0179840 A1 | 7/2009 | Tanaka et al. | |
| 2009/0185127 A1 | 7/2009 | Tanaka et al. | |
| 2010/0031590 A1 | 2/2010 | Buchwald et al. | |
| 2010/0086706 A1* | 4/2010 | Everaerts | B32B 27/00 428/354 |
| 2012/0202030 A1 | 8/2012 | Kondo et al. | |
| 2013/0088441 A1 | 4/2013 | Chung et al. | |
| 2014/0036428 A1 | 2/2014 | Seng et al. | |
| 2014/0232969 A1* | 8/2014 | Tsubaki | G02F 1/133308 156/305 |
| 2015/0246507 A1 | 9/2015 | Brown et al. | |
| 2016/0297176 A1 | 10/2016 | Rickerl | |
| 2016/0306451 A1 | 10/2016 | Isoda et al. | |
| 2016/0375808 A1 | 12/2016 | Etienne et al. | |
| 2017/0008377 A1 | 1/2017 | Fisher et al. | |
| 2017/0021661 A1 | 1/2017 | Pelucchi | |
| 2017/0059749 A1 | 3/2017 | Wakatsuki et al. | |
| 2017/0197561 A1* | 7/2017 | McFarland | B44C 5/0407 |
| 2017/0197870 A1* | 7/2017 | Finkeldey | C03C 3/087 |
| 2017/0327402 A1 | 11/2017 | Fujii et al. | |
| 2017/0349473 A1 | 12/2017 | Moriya et al. | |
| 2018/0050948 A1 | 2/2018 | Faik et al. | |
| 2018/0111569 A1* | 4/2018 | Faik | B60K 35/00 |
| 2018/0147985 A1 | 5/2018 | Brown et al. | |
| 2018/0149777 A1 | 5/2018 | Brown | |
| 2018/0149907 A1 | 5/2018 | Gahagan et al. | |
| 2018/0188869 A1 | 7/2018 | Boggs et al. | |
| 2018/0188870 A1* | 7/2018 | Boggs | B32B 1/00 |
| 2018/0210118 A1 | 7/2018 | Gollier et al. | |
| 2018/0245125 A1 | 8/2018 | Tsai et al. | |
| 2019/0329531 A1 | 10/2019 | Brennan et al. | |

FOREIGN PATENT DOCUMENTS

| | | |
|---|---|---|
| CN | 203825589 U | 9/2014 |
| CN | 104679341 A | 6/2015 |
| CN | 204463066 U | 7/2015 |
| CN | 104843976 A | 8/2015 |
| CN | 105118391 A | 12/2015 |
| CN | 105511127 A | 4/2016 |
| DE | 4415878 A1 | 11/1995 |
| DE | 102004022008 A1 | 12/2004 |
| DE | 102013214108 A1 | 2/2015 |
| FR | 2918411 A1 | 1/2009 |
| GB | 2011316 A | 7/1979 |
| JP | 52-040349 A | 3/1977 |
| JP | 11-060293 A | 3/1999 |
| JP | 3059337 B2 | 7/2000 |
| JP | 2003-500260 A | 1/2003 |
| JP | 2003-321257 A | 11/2003 |
| JP | 2004-284839 A | 10/2004 |
| JP | 2013-084269 A | 5/2013 |
| JP | 2013-188993 A | 9/2013 |
| JP | 2014-160218 A | 9/2014 |
| JP | 2015-092422 A | 5/2015 |
| JP | 5748082 B2 | 7/2015 |
| JP | 2016-031696 A | 3/2016 |
| JP | 5976561 B2 | 8/2016 |
| JP | 2016-173794 A | 9/2016 |
| JP | 2016-203609 A | 12/2016 |
| JP | 2016-207200 A | 12/2016 |
| JP | 2017-186241 A | 10/2017 |
| JP | 2019-524614 A | 9/2019 |
| KR | 10-2016-0144008 A | 12/2016 |
| WO | 98/01649 A1 | 1/1998 |
| WO | 00/73062 A1 | 12/2000 |
| WO | 2007/108861 A1 | 9/2007 |
| WO | 2012/058084 A2 | 5/2012 |
| WO | 2014/175371 A1 | 10/2014 |
| WO | 2015/031594 A2 | 3/2015 |
| WO | 2016/044360 A1 | 3/2016 |
| WO | 2016/125713 A1 | 8/2016 |
| WO | 2016/136758 A1 | 9/2016 |
| WO | 2016/196531 A1 | 12/2016 |
| WO | 2016/196546 A1 | 12/2016 |
| WO | 2017/155932 A1 | 9/2017 |
| WO | 2018/005646 A1 | 1/2018 |
| WO | 2018/009504 A1 | 1/2018 |
| WO | 2018/075853 A1 | 4/2018 |
| WO | 2018/081068 A1 | 5/2018 |
| WO | 2018/125683 A1 | 7/2018 |

OTHER PUBLICATIONS

Datsiou et al., "Behaviour of cold bent glass plates during the shaping process", Engineered Transparency. International Conference at glasstec, Dusseldorf, Germany, Oct. 21 and 22, 2014, 10 pages.

Galuppi et al., "Optimal cold bending of laminated glass", International Journal of Solids and Structures, vol. 67-68, 2015, pp. 231-243.

Haubert et al., "PDMS bonding by means of a portable, low-cost corona system", Lab Chip, vol. 6, 2006, pp. 1548-1549.

Henniker Plasma., "Plasma treated PDMS for improved bonding performance of microfluidic devices", Application Note, 2017, 6 pages.

Hoang et al., "Irreversible bonding of polyimide and polydimethylsiloxane (PDMS) based on a thiol-epoxy click reaction", Journal of Micromechanics and Microengineering, vol. 26, 2016, 105019, 9 pages.

(56) References Cited

OTHER PUBLICATIONS

How do you succeed your glass PDMS plasma bonding?, Microfluidic Review, Online Available at (https://www.elveflow.com/microfluidic-tutorials/soft-lithography-reviews-and-tutorials/how-to-get-the-best-process/soft-lithography-glass-pdms-bonding/), retrieved on Mar. 16, 2021, 4 pages.

How to choose the right plasma cleaner for the PDMS bonding of your microfluidic chip?, Microfluidic Review, Online Available at (https://www.elveflow.com/microfluidic-tutorials/soft-lithography-reviews-and-tutorials/how-to-choose-your-soft-lithography-instruments/pdms-soft-lithography-plasma-cleaner/), retrieved on Mar. 16, 2021, 4 pages.

International Search Report and Written Opinion of the International Searching Authority; PCT/US2018/012215, mailed on Aug. 1, 2018, 19 pages; European Patent Office.

International Search Report and Written Opinion of the International Searching Authority; PCT/US2018/041062, mailed on Nov. 13, 2018, 13 pages, European Patent Office.

Invitation to Pay Additional Fees of the International Searching Authority; PCT/US2018/012215; Mailed May 11, 2018; 10 Pages; European Patent Office.

O'Neill et al., "Rapid curing of PDMS for microfluidic applications by Francesca Burgoyne", Chips and Tips, Royal Chemistry of Chemistry, Online available at (http://blogs.rsc.org/chipsandtips/2006/10/23/rapid-curing-of-pdms-for-microfluidic-applications/?doing_wp_cron=1520260596.4324409961700439453125), Oct. 23, 2006, 8 pages.

Ren et al., "A Simple and Reliable Pdms and Su-8 Irreversible Bonding Method and Its Application on a Microfluidic-Mea Device for Neuroscience Research", Micromachines, vol. 6, 2015, pp. 1923-1934.

Shantanu Bhattacharya, Plasma bonding of poly (dimethyl) siloxane and glass surfaces and its application to microfluidics, Master of Science in Mechanical Engineering Thesis, Texas Tech University, Dec. 2003, 107 pages.

Standard Test Method for Measurement of Glass Stress-Optical Coefficient, ASTM standard C770-98, 2013, 8 pages.

Sunkara et al., "Simple room temperature bonding of thermoplastics and poly(dimethylsiloxane)", Lab Chip, 11, 2011, pp. 962-965.

Tang et al., "A facile route for irreversible bonding of plastic-PDMS hybrid microdevices at room temperature", Lab Chip, vol. 10, 2010, pp. 1274-1280.

Tennico et al., "Surface modification-assisted bonding of polymer-based microfluidic devices", Sens. and Actuators B, vol. 143, 2010. pp. 799-804.

International Search Report and Written Opinion of the International Searching Authority; PCT/US19/43187; Mailed Oct. 16, 2019; 9 Pages; European Patent Office.

Japanese Patent Application No. 2021-504259, Office Action, dated Apr. 20, 2023, 10 pages (5 pages of English Translation and 5 pages of Original Copy); Japanese Patent Office.

Sunkara et al., "Investigation on the Mechanism of Aminosilane-Mediated Bonding of Thermoplastics and Poly (dimethylsiloxane)," ACS Appl. Mater. Interfaces, 2012, 4, 6537-6544.

\* cited by examiner

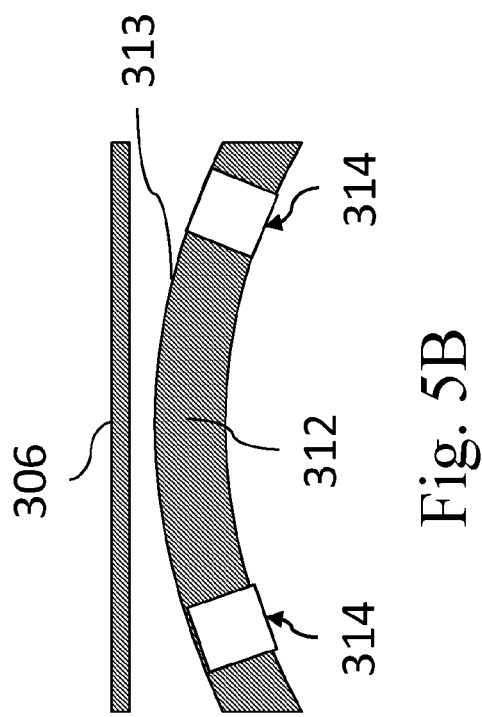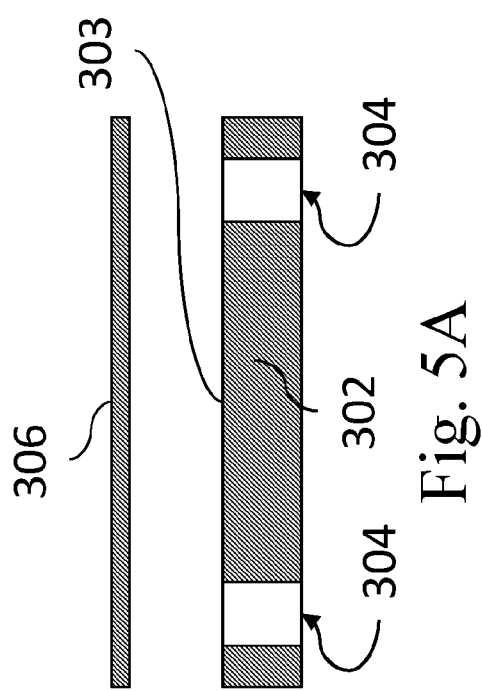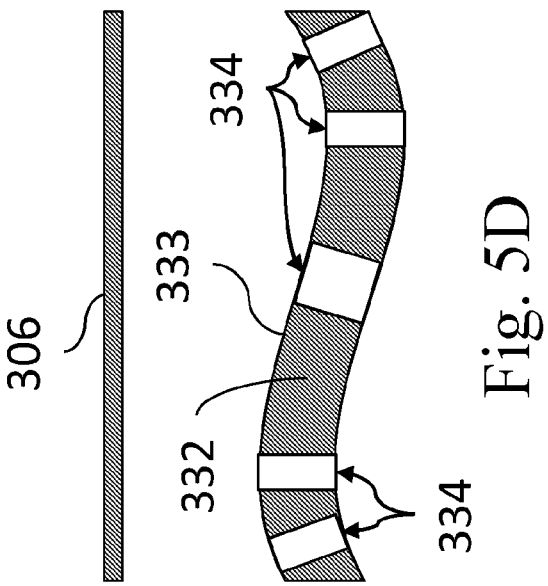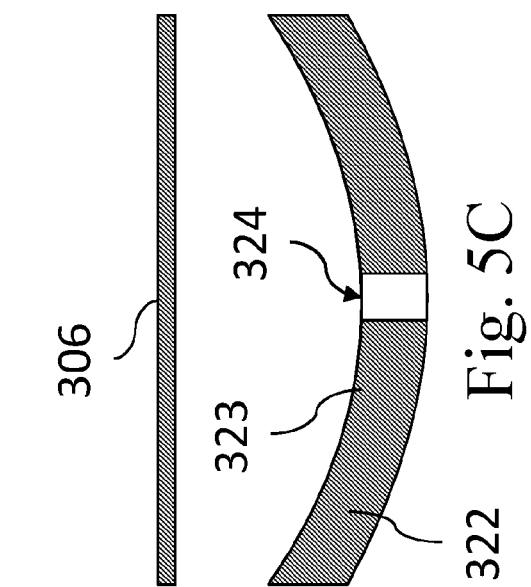
Fig. 5A
Fig. 5B
Fig. 5C
Fig. 5D

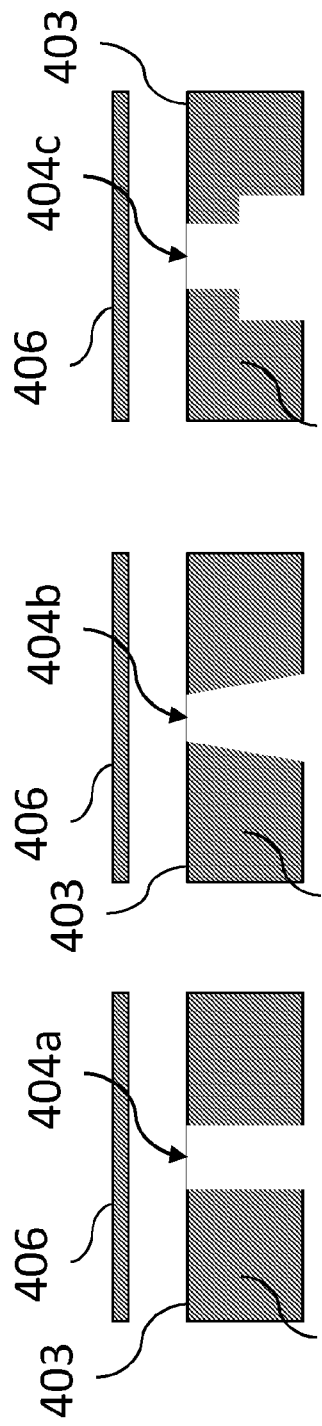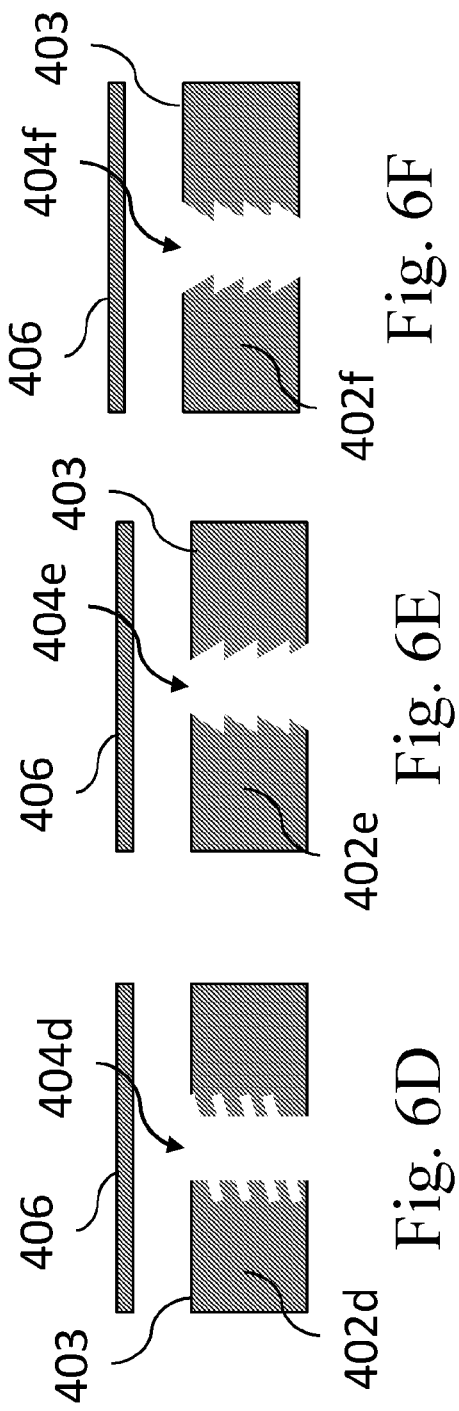

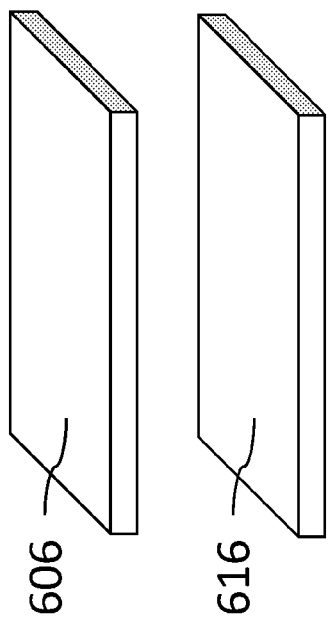
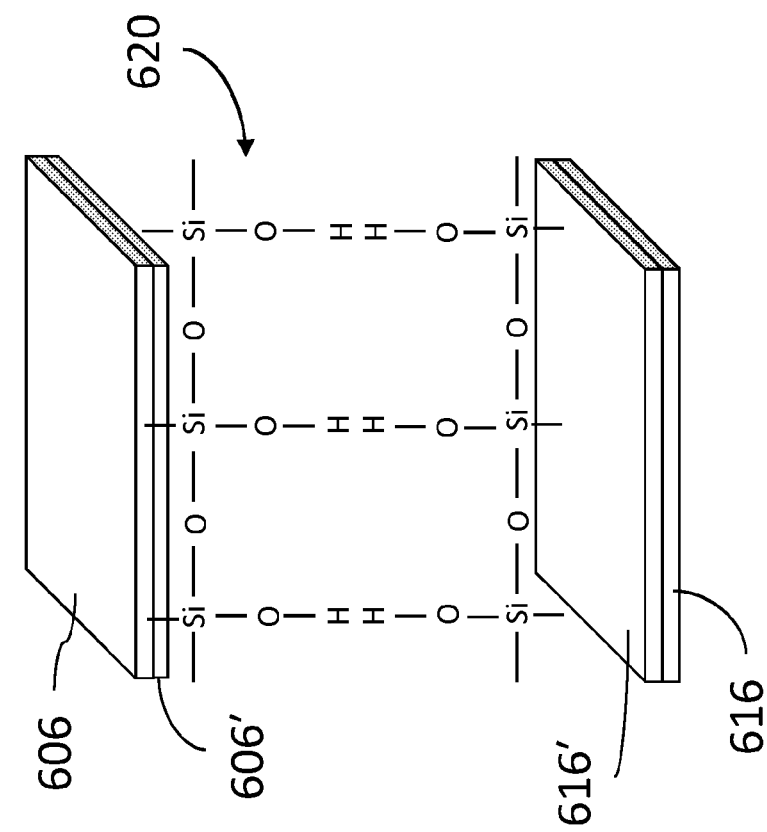
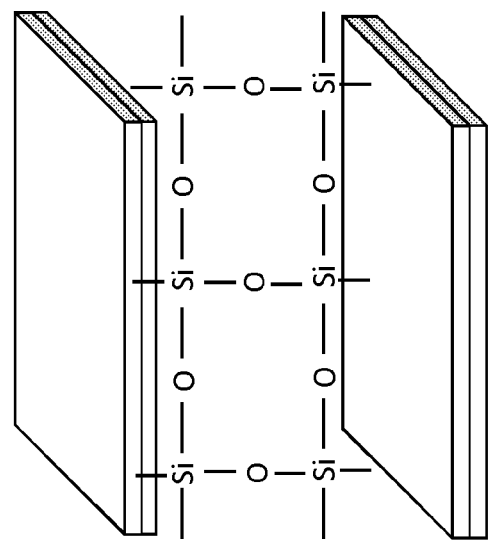
Fig. 10A
Fig. 10B
Fig. 10C

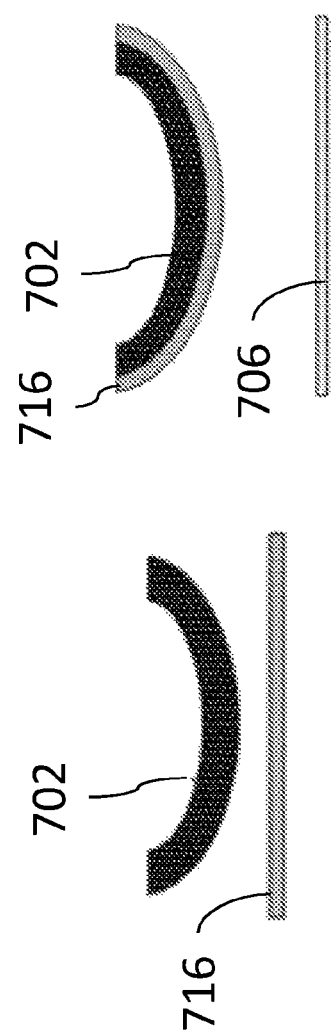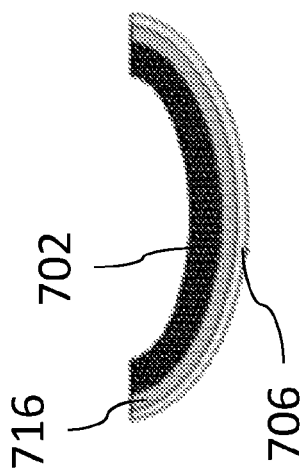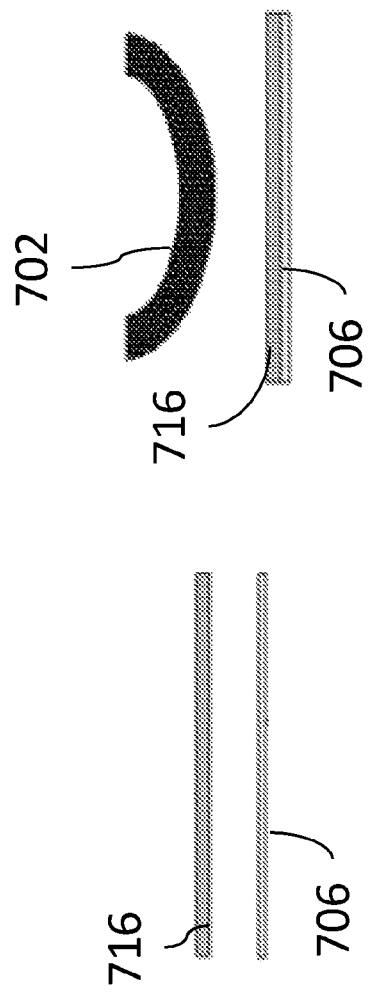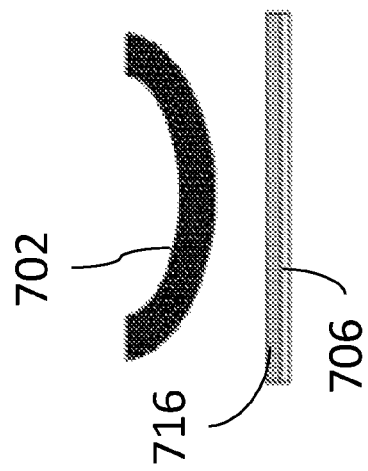
Fig. 11A
Fig. 11B
Fig. 11C
Fig. 11D
Fig. 11E
Fig. 11F

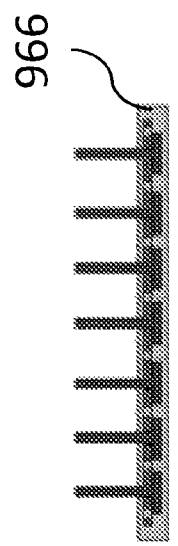
Fig. 15A
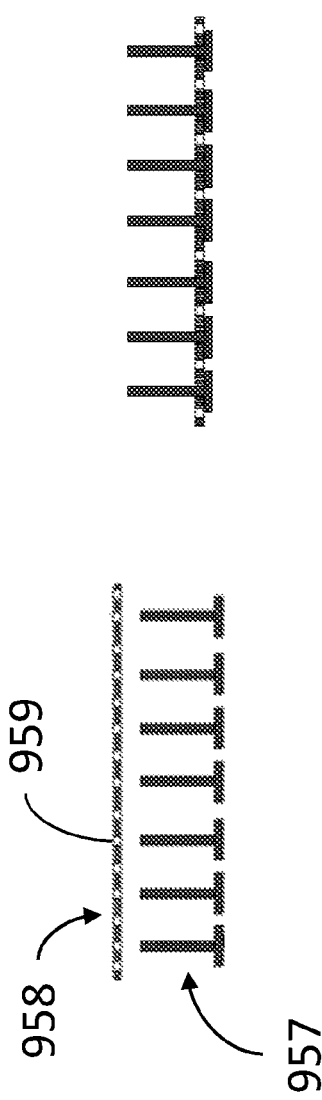
Fig. 15B
Fig. 15C
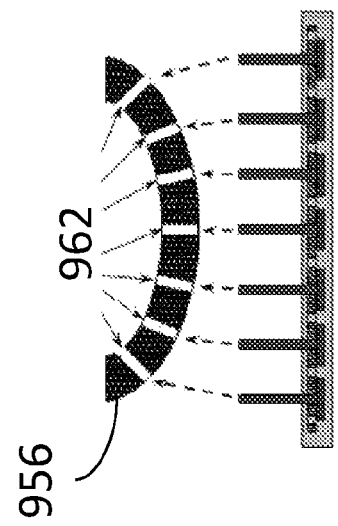
Fig. 15D
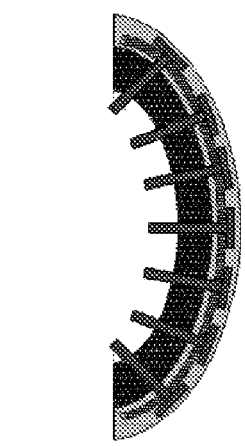
Fig. 15E
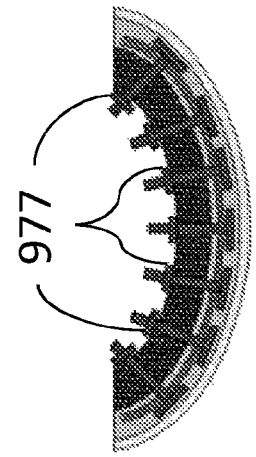
Fig. 15F

COLD-FORMED CURVED GLASS ARTICLES AND METHODS OF MAKING THE SAME

CROSS-REFERENCE TO RELATED APPLICATIONS

This application is a national stage application under 35 U.S.C. § 371 of International Application No. PCT/US2019/043187, filed on Jul. 24, 2019, which claims the benefit of priority under 35 U.S.C. § 119 of U.S. Provisional Application Ser. No. 62/703,520 filed on Jul. 26, 2018 the content of which is relied upon and incorporated herein by reference in its entirety.

TECHNICAL FIELD

The disclosure relates to vehicle interior components including a glass substrate and methods for forming the same, and more particularly to a cold-formed or cold-bent curved glass substrate and methods for forming the same.

BACKGROUND

Vehicle interiors include curved surfaces and can incorporate displays, touch panels and/or other cover glass components in such curved surfaces. The materials used to form such curved surfaces are typically limited to polymers, which do not exhibit the durability and optical performance of glass. As such, Applicant has determined that curved glass substrates are desirable, especially when used as covers for displays and/or touch panels. Existing methods of forming such curved glass substrates, such as thermal forming, have drawbacks including high cost, optical distortion, and surface marking. Vehicle designs are evolving to include more displays and touch interfaces, which can have cover glass that is flat or curved. Decorative glass surfaces may also be used for non-display or non-touch panel surfaces, due to the sleek and versatile appearance of glass. Applicant has identified a need for vehicle interior systems that can incorporate a curved glass substrate in a cost-effective manner and without problems typically associated with glass thermal forming processes, and while also having the mechanical performance to pass industry-standard safety tests and regulations.

SUMMARY

One embodiment of the disclosure relates to a vehicle interior component including a frame having a support surface and an opening formed in the support surface, a glass substrate, and a first adhesive at least partially disposed in the opening and adhering the glass substrate to the frame. The glass substrate includes a first major surface, a second major surface facing the support surface, and a minor surface between the first and second major surfaces and defining a thickness of the glass substrate. The first adhesive and the opening operate in concert to prevent delamination of the vehicle interior component. An aspect of some embodiments of this disclosure provides a vehicle interior system including the vehicle interior component and at least one of a decorative layer on one of the first and second major surfaces of the glass substrate, a display module, or a touch panel.

Another embodiment of this disclosure relates to a method of cold-bending a glass substrate. The method includes providing a frame having a support surface with one or more openings formed in the support surface. The method also includes positioning a glass substrate on the support surface, where the glass substrate has a first major surface, a second major surface facing the support surface, and a minor surface between the first and second major surfaces and defining a thickness of the glass substrate. The method includes applying a force to the glass substrate to conform the second major surface to the support surface while a temperature of the glass substrate is below the glass transition temperature of the glass substrate, and providing a first adhesive in contact with the second major surface and at least partially within the one or more openings, where the first adhesive holds the second major surface in conformance with the support surface, and the first adhesive and opening act in concert to prevent delamination of the glass substrate from the frame. An aspect of embodiments includes a vehicle interior system made according to this method.

Another embodiment of this disclosure relates to a method of forming a vehicle interior component. The method includes providing a frame having a support surface with a curved surface and one or more openings formed in the support surface, and also providing a glass substrate with a first major surface, a second major surface opposite the first major surface, and a minor surface between the first and second major surfaces and defining a thickness of the glass substrate. The method further includes conforming the second major surface to the support surface by applying a force to the glass substrate, and providing a first adhesive in contact with the second major surface and within the one or more openings. The first adhesive engages a retaining feature within the one or more opening. The retaining feature is able to exert a force on the first adhesive to oppose delamination of the glass substrate from the support surface.

Another embodiment of this disclosure relates to a method of cold-bending a cover glass to a curved frame. The method includes providing a polydimethylsiloxane structure having a base with a primary surface and one or more raised portions, and providing a structural frame. The structural frame has a front surface, a rear surface opposite to the front surface, and one or more through-holes extending from the front surface to the rear surface. The through-holes are sized to allow the raised portions to be inserted into the through-holes. The method includes attaching the polydimethylsiloxane structure to the structural frame by inserting the one or more raised portions into the one or more through-holes, where the primary surface substantially conforms to a shape of the front surface. The method further includes providing a glass substrate having a first major surface, a second major surface facing the support surface, and a minor surface between the first and second major surfaces and defining a thickness of the glass substrate. The method also includes exposing the primary surface of the polydimethylsiloxane structure and the second major surface of the glass substrate to a plasma environment. The first adhesive is disposed in the first portion and the second portion of the opening, and the combination of the first adhesive in the opening acts as a retaining feature for the conformed glass substrate.

Another embodiment of this disclosure relates to a method of cold-bending a cover glass to a curved frame. The method includes providing a polydimethylsiloxane structure having a base with a primary surface and one or more raised portions, and providing a structural frame having a front surface, a rear surface opposite to the front surface, and one or more through-holes extending from the front surface to the rear surface. The through-holes are sized to allow the raised portions to be inserted into the through-holes. The method includes attaching the polydimethylsiloxane structure to the structural frame by inserting the one or more raised portions into the one or more through-holes, the primary surface substantially conforming to a shape of the front surface. The method also includes providing a glass substrate having a first major surface, a second major surface facing the support surface, and a minor surface between the first and second major surfaces and defining a thickness of the glass substrate, and exposing the primary surface of the polydimethylsiloxane structure and the second major surface of the glass substrate to a plasma environment and then plasma-bonding the second major surface to the primary surface of the polydimethylsiloxane structure.

An additional embodiment of this disclosure relates to a vehicle interior component. The vehicle interior component includes a frame having a support surface, a rear surface opposite to the front surface, and one or more openings formed in the support surface, and also includes a glass substrate having a first major surface, a second major surface facing the support surface, and a minor surface between the first and second major surfaces and defining a thickness of the glass substrate. A bonding layer is between the glass substrate and the frame, and adheres the glass substrate to the frame. The bonding layer is disposed on the support surface, in the one or more openings, and on at least a portion of the rear surface.

Another embodiment of this disclosure relates to a vehicle interior component. The vehicle interior component includes a frame having a curved support surface, a rear surface opposite to the front surface, and one or more openings formed in the curved support surface, and also includes a glass substrate. The glass substrate has a first major surface, a second major surface facing the curved support surface, and a minor surface between the first and second major surfaces and defining a thickness of the glass substrate. A bonding layer is between the glass substrate and the frame, and adheres the glass substrate to the frame. A plurality of bolts having a first portion with a first width and a second portion with a second width are provided. The first width is larger than a width of the one or more openings, and the second width is less than the first width and equal to or less than the width of the one or more openings. At least the first portion of the plurality of bolts is encapsulated in the bonding layer, and the second portion of the plurality of bolts extends through the one or more openings to the rear surface. An end of the second portion is secured behind the rear surface with one or more fasteners or nuts, and the glass substrate is plasma-bonded to the bonding layer.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIGS. 5A-5D are schematic cross-sectional views of glass substrates and frames having one or more openings, according to some embodiments.

FIGS. 6A-6F are cross-sectional, exploded views of vehicle interior components with frames having different styles of openings, according to some embodiments.

FIGS. 10A-10C are isometric exploded schematic views of a glass substrate and polydimethylsiloxane (PDMS) layer throughout a plasma bonding process, including (A) before exposure to a plasma, (B) after exposure to a plasma, and (C) after plasma bonding, according to some embodiments.

FIGS. 11A-11F are cross-sectional views of a vehicle interior component in various stages of assembly, according to some embodiments.

FIGS. 15A-15F are cross-sectional views of a vehicle interior component in various stages of assembly, according to one or more embodiments.

DETAILED DESCRIPTION

Figure 1:
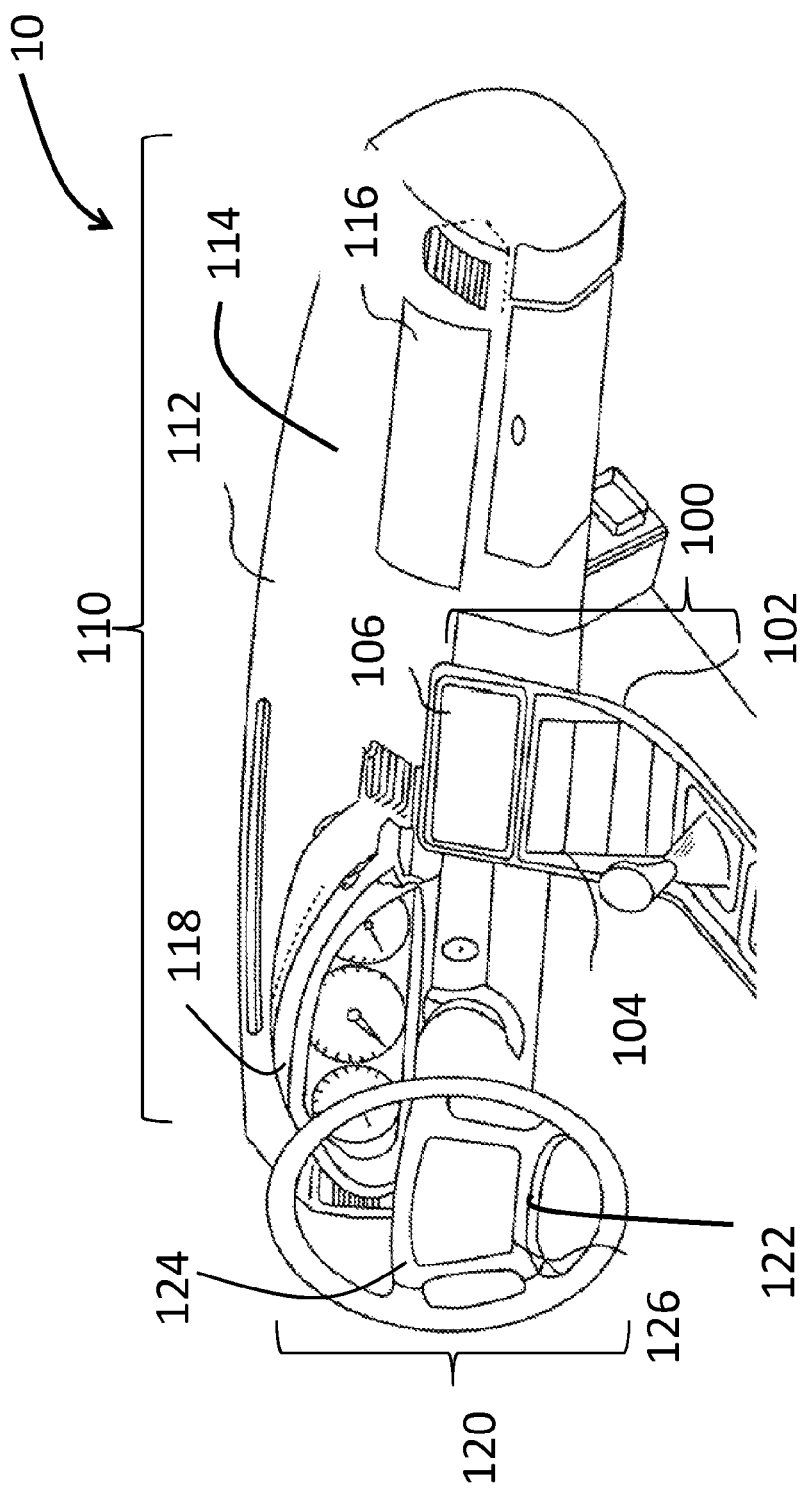
FIG. 1 is a perspective view of a vehicle interior with vehicle interior systems, according to one or more embodiments.

Reference will now be made in detail to various embodiments, examples of which are illustrated in the accompanying drawings. In general, a vehicle interior system may include a variety of different curved surfaces that are designed to be transparent, such as curved display surfaces and curved non-display glass covers, and the present disclosure provides articles having these curved surfaces and methods for forming these curved surfaces from a glass material. Forming curved vehicle surfaces from a glass material provides a number of advantages compared to the typical curved plastic panels that are conventionally found in vehicle interiors. For example, glass is typically considered to provide enhanced functionality and user experience in many curved cover material applications, such as display applications and touch screen applications, compared to plastic cover materials. Glass surfaces can also extend beyond the boundaries of displays and touch panels to provide a seamless glass surface over a large surface area. Areas of the glass may also be decorative with a variety of colors, patterns, textures, including an appearance that mimics other materials, such a metal, wood, leather, carbon fiber, or other surfaces.

While glass provides these benefits, glass surfaces in vehicle interiors should also meet performance criteria for both passenger safety and ease of use. For example, certain regulations (e.g., ECE R 21 & FMVSS201) require vehicle interiors to pass the Headform Impact Test (HIT). The HIT involves subjecting a vehicle interior component, such as a display, to an impact from a mass under certain specific conditions. The mass used is an anthropomorphic headform. The HIT is intended to simulate the impact of the head of a driver or passenger against the vehicle interior component. The criteria for passing the test includes the force of the deceleration of the headform not exceeding 80 g (g-force) for longer than a 3 ms period, and the peak deceleration of the headform being less than 120 g. As used in the context of the HIT, "deceleration" refers to the deceleration of the headform as it is stopped by the vehicle interior component. Besides these regulatory requirements, there are additional concerns when using glass under these conditions. For example, it may be desirable for the glass to remain intact and not fracture when subjected to the impact from the HIT. In some cases, it may be acceptable for the glass to fracture, but the fractured glass should behave in a way to reduce the chance of causing lacerations on a real human head. In the HIT, laceration potential can be simulated by wrapping the headform in a substitute material representing human skin, such as a fabric, leather, or other material. In this way, laceration potential can be estimated based on the tears or holes formed in the substitute material. Thus, in the case where the glass fractures, it may be desirable to decrease the chance of laceration by controlling how the glass fractures.

Cover glasses are often adhered to some underlying structure or frame with adhesives and/or mechanical restraints. It is important during the lifetime of a product that the cover glass stays adhered to such underlying structure and does not delaminate. This is a concern in vehicle interiors were driver and passenger safety can be affected if a glass surface were to become delaminated. In addition, vehicles have long lifetimes (much longer than many consumer electronics such as mobile phones) and face harsh environmental conditions. Thus, it is desirable for a vehicle interior component to have sufficient mechanical integrity to withstand these harsh conditions over the lifetime of the vehicle.

Accordingly, as will be discussed in more detail below, Applicant has developed a glass article and related manufacturing processes that provide an efficient and cost-effective way to form an article, such as a display for a vehicle interior system, utilizing a cold-bent piece of glass substrate. In general, the manufacturing process discussed herein provides for cold-bending of a glass article to a frame using a bonding material. In this process, the frame has one or more openings to allow in-flow of the bonding material into the openings, which can provide additional strength for holding the cold-bent glass article in its cold-bent state and prevent unwanted deformation or delamination of the glass article from the frame. In addition to providing increased lamination strength between a cover glass and a frame, embodiments discussed herein provide simple and scalable manufacturing processes for forming these articles.

As used herein, the terms "cold-bent," "cold bending," "cold-formed" or "cold forming" refers to curving the glass substrate at a cold-form temperature, which is less than the glass transition temperature of the glass material of glass substrate.

In some embodiments, the glass substrate is bent to a curved shape on a curved mold surface via application of a force (e.g., via a vacuum chuck, electrostatic chuck, a press, etc.). For example, the curved mold surface can be a vacuum chuck or electrostatic chuck, or part a press, where the force to bend the glass substrate can be a pressure differential, an electrostatic force, or a force from contacting the press surface. While in the bent shape, a bonding material can be provided onto the exposed surface of the glass substrate, in some embodiments. Then, a frame having a curved support surface (e.g., corresponding to the curved shape of the curved mold surface) is brought into contact with the glass substrate while in the bent shape, such that the bonding material is disposed between the support surface and the glass substrate. The amount of the bonding material previously applied to the glass substrate can be an amount sufficient to fill in one or more openings or through-holes in the curved support surface of the frame as the frame is pressed onto the combined glass substrate and bonding material. Alternatively, in some embodiments, during or after application of the frame to the glass substrate, the bonding material can be supplied via the through-holes from a rear side of the frame. In this way, substantially all, or only a supplementary amount, of the bonding material can be applied to fill the openings in the frame.

In some embodiments, the bonding material is bonded to the glass substrate only at the location of the openings, and is not present in other areas of the space between the glass substrate and the support surface. Due to the effectiveness of embodiments herein, such localized use of the bonding material can be sufficient for maintaining the cold-bent state of the glass substrate.

By filling in the openings or through-holes, the bonding material can have an enhanced attachment to the frame, which in turn enhances the structural integrity and/or rigidity of the finished article. For example, the through-holes can be shaped to resist a force on the bonding material and/or glass substrate that might otherwise lead to delamination of the glass substrate from the frame or bonding material. In some embodiments, the through-holes have two or more sections through the thickness of the support surface that have different widths, where, if a force attempts to pull the bonding material out of the through-hole in the direction of the glass substrate, a narrower section of the through-hole that is closer to the support surface can exert a force on the bonding material that is within the deeper, wider section of the through-hole. Thus, the narrower section acts as a retaining feature to prevent the bonding material from becoming detached from the frame.

After the frame and bonding material are applied to the cold-bent glass substrate, the bonding material is solidified (e.g., via cooling, curing, or the like) to form a curved article with direct engagement (e.g., via bonding or adhesion) between the bonding material and a surface of the glass substrate. The direct engagement and the rigidity of the combined frame and bonding material holds the glass substrate in the curved shape in the completed article. In this process, use of a separate adhesive material or physical restraining mechanisms can be avoided. Further, by utilizing the molding technology and equipment as discussed herein, Applicant believes that high-throughput and efficient manufacture of articles including a cold-bent cover glass structure is provided in a manner not achievable with conventional hot glass bending processes.

Further in typical processes, curved glass articles are formed using hot forming processes. As discussed herein a variety of curved glass articles and processes for making the same are provided that avoid the deficiencies of the typical glass hot-forming process. For example, hot-forming processes are energy intensive and increase the cost of forming a curved glass component, relative to the cold-bending process discussed herein. In addition, hot-forming processes typically make application of glass surface treatments, such as anti-reflective coatings, significantly more difficult. For example, many coating materials cannot be applied to a flat piece of glass material prior to the hot-forming process because the coating material typically will not survive the high temperatures of the hot-forming process. Further, application of a coating material to surfaces of a curved glass substrate after hot-bending is substantially more difficult than application to a flat glass substrate. In addition, Applicant believes that by avoiding the additional high temperature heating steps needed for thermal forming, the glass articles produced via the cold-forming processes and systems discussed herein have improved optical properties and/or improved surface properties than similarly shaped glass articles made via thermal-shaping processes.

Thus, for at least these reasons, Applicant believes that the glass article and processes for making the glass articles discussed herein provide for various combinations of benefits and properties not previously achievable with either non-glass articles for vehicle systems or with previously developed glass articles.

With reference to FIG. 1, a vehicle interior 10 may include various components and systems having a glass surface, such as vehicle interior systems 100, 110, 120. Vehicle interior system 100 includes a frame, shown as center console base 102, with a curved surface 104 including a curved display 106. Vehicle interior system 110 includes a frame, shown as dashboard base 112, with a curved surface 114 including a curved display 116. The dashboard base 112 typically includes an instrument panel 118, which may also include a curved display. Vehicle interior system 120 includes a frame, shown as steering wheel base 122, with a curved surface 124 and a curved display 126. In one or more embodiments, the vehicle interior system includes a frame that is an arm rest, a structural pillar, a seat back, a floor board, a headrest, a door panel, or any portion of the interior of a vehicle that includes a curved surface. In other embodiments, the frame is a portion of a housing for a free-standing display (e.g., a display that is not permanently connected to a portion of the vehicle, or a display that is mounted apart from one of the surfaces or frames described above). While embodiments discussed herein may be discussed with reference to curved glass substrates, frames, surfaces, displays, etc., it is contemplated that embodiments include articles and vehicle interior systems having flat glass substrates, frames, surfaces, displays, etc.

The embodiments of the curved glass article described herein can be used in each of vehicle interior systems 100, 110 and 120. Further, the curved glass articles discussed herein may be used as curved cover glasses for any of the curved display embodiments discussed herein, including for use in vehicle interior systems 100, 110 and/or 120. Further, in various embodiments, various non-display components of vehicle interior systems 100, 110 and 120 may be formed from the glass articles discussed herein. In some such embodiments, the glass articles discussed herein may be used as the non-display cover surface for the dashboard, center console, door panel, etc. In such embodiments, glass material may be selected based on its weight, aesthetic appearance, etc. and may be provided with a coating (e.g., an ink or pigment coating) with a pattern (e.g., a brushed metal appearance, a wood grain appearance, a leather appearance, a colored appearance, etc.) to visually match the glass substrate with adjacent non-glass components or for other design or aesthetic reasons. In specific embodiments, such ink or pigment coating may have a transparency level that provides for deadfront functionality.

Figure 2:
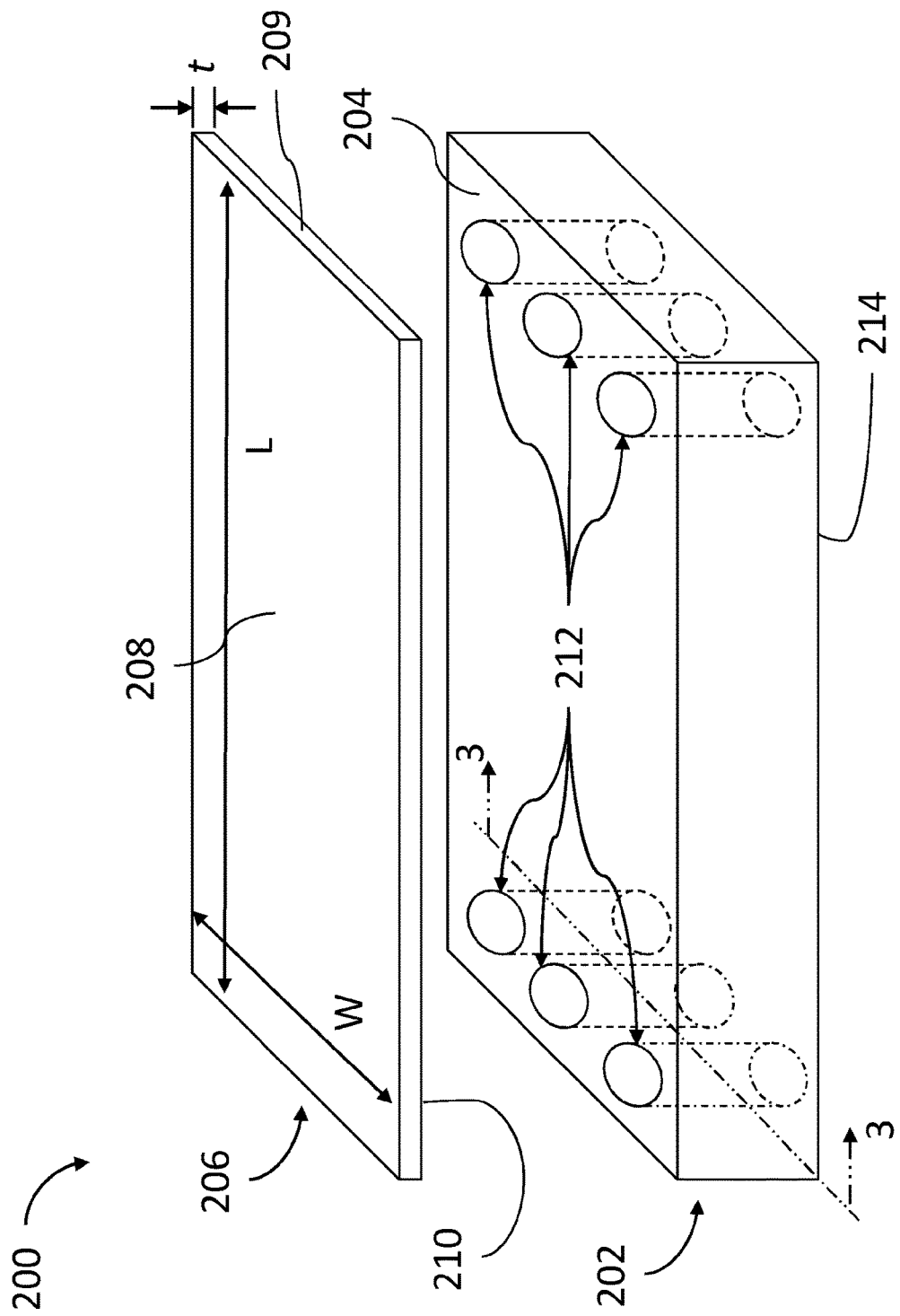
FIG. 2 is an isometric, exploded view of a glass substrate and frame of a vehicle interior component, according to some embodiments.

As shown in FIG. 2, a vehicle interior component 200 includes a frame 202 having a support surface 204, and a glass substrate 206. The glass substrate 206 has a first major surface 208 and a second major surface 210 separated from the first major surface by a minor surface 209, which defines a thickness t of the glass substrate 206. In specific embodiments, the minor surface 209 defines the outer perimeter of glass substrate 206. In a finished state of the vehicle interior component 200, the first major surface 208 is the surface facing an interior of the vehicle (i.e., facing a user of the vehicle interior component or a driver/passenger of the vehicle). The frame 202 has a number of openings 212 formed in the support surface 204. The openings 212 extend from the support surface 204 to a rear surface 214 of the frame 202. In some embodiments, the openings may not extend to the rear surface 214, but may only extend to a certain depth within the frame 202. A bonding material or adhesive (see FIG. 3) is used to attach the second major surface 2010 of the glass substrate 206 to the support surface 204.

In various embodiments, the first major surface 208 and/or the second major surface 210 of glass substrate 206 can include one or more surface treatments or layers. Surface treatments may cover at least a portion of the first major surface 208 and/or second major surface 210. Exemplary surface treatments include anti-glare surfaces/coatings, anti-reflective surfaces/coatings, and a pigment design. In one or more embodiments, at least a portion of the first major surface 208 and/or the second major surface 210 may include any one, any two or all three of an anti-glare surface, an anti-reflective surface, and a pigment design. For example, first major surface 208 may include an anti-glare surface and second major surface 210 may include an anti-reflective surface. In another example, first major surface 208 includes an anti-reflective surface and second major surface 210 includes an anti-glare surface. In yet another example, first major surface 208 comprises either one of or both the anti-glare surface and the anti-reflective surface, and second major surface 210 includes the pigment design.

The pigment design may include any aesthetic design formed from a pigment (e.g., ink, paint and the like) and can include a wood-grain design, a brushed metal design, a graphic design, a portrait, or a logo. The pigment design may be printed onto the glass substrate. In one or more embodiments, the anti-glare surface includes an etched surface. In one or more embodiments, the anti-reflective surface includes a multi-layer coating.

Figure 3:
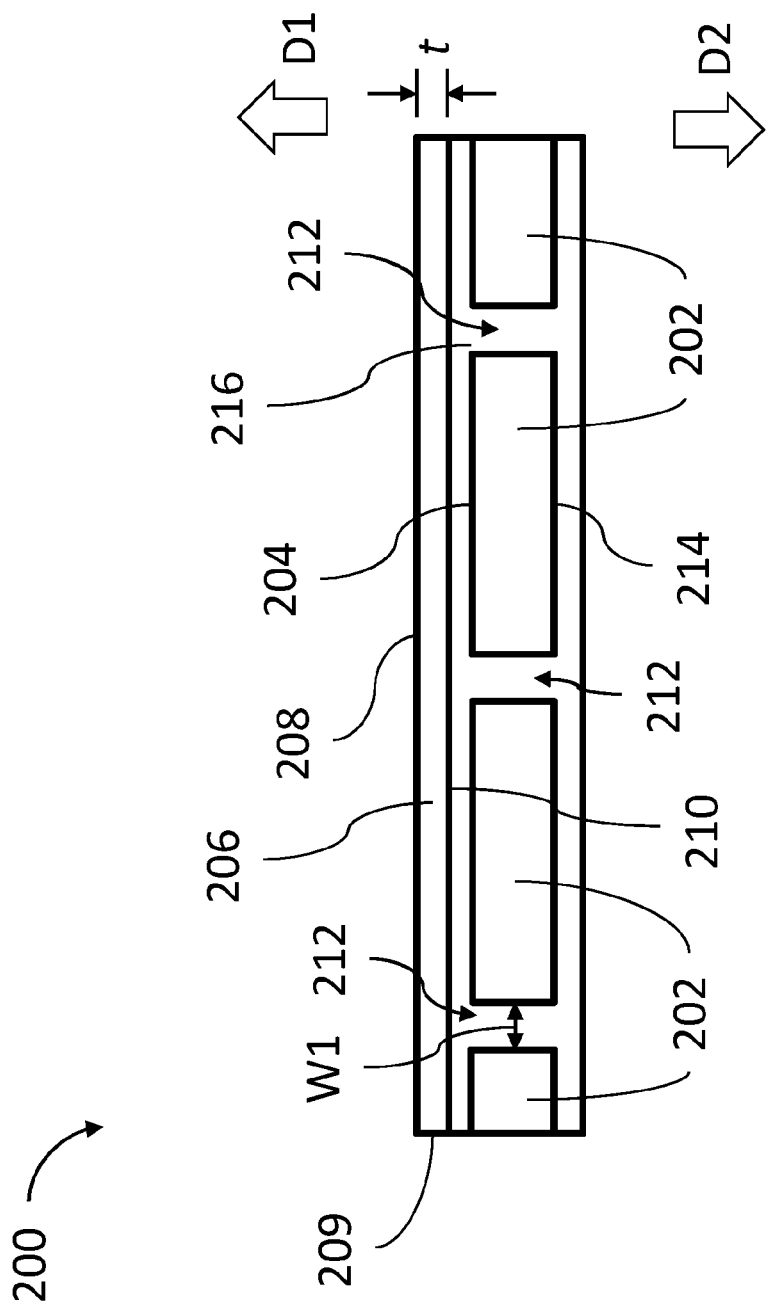
FIG. 3 is a cross-sectional view of the vehicle interior component of FIG. 2 following attachment of the glass substrate to the frame of FIG. 2, according to an embodiment.

FIG. 3 is a cross-sectional view along line 3-3 in FIG. 2. As shown in FIG. 3, the openings 212 have a width W1. In some embodiments where the frame has multiple openings, the openings may have the same width W1, or they may have two or more different widths. The bonding material 216 is provided between the support surface 204 of the frame 202 and the second major surface 210 of the glass substrate 209. In addition, the bonding material fills the openings 212 and covers the rear surface 214 of the frame 202. In some embodiments, the bonding material 216 covers all or a substantial portion of the rear surface 214, as shown in FIG. 3. In other embodiments, the bonding material 216 may cover only portion of the rear surface 214 in the vicinity of the openings 212 on the rear surface 214. In still other embodiments, the bonding material 216 may not cover any of the rear surface 214 and instead may be confined to the support surface 204 and the openings 212. An advantage from the bonding material 216 covering all or a portion of the rear surface 214 is that, if a force having a component in the direction D1 is exerted on the glass substrate 209 or the bonding material 216, the rear surface 214 can exert a force on the bonding material 216 in the direction D2. However, according to some embodiments, the openings 212 may also exert such force on the adhesive material even if the bonding material does not cover a portion of the rear surface, as discussed below. In these configurations, the engagement between the bonding material 216 and the frame 202 provides greater structural integrity to the vehicle interior component and can prevent damage or delamination of the component, and helps the glass substrate maintain the intended cold-bent shape.

According to one or more embodiments, the bonding material may include an epoxy, a silicone material, an acrylic, a cyanoacrylate, a urethane, an epoxy acrylate, or polydimethylsiloxane (PDMS). A fast-curing epoxy (e.g., Loctite® EA 9017 Two Part Clear Fast Cure Epoxy) is one suitable example.

Figure 4:
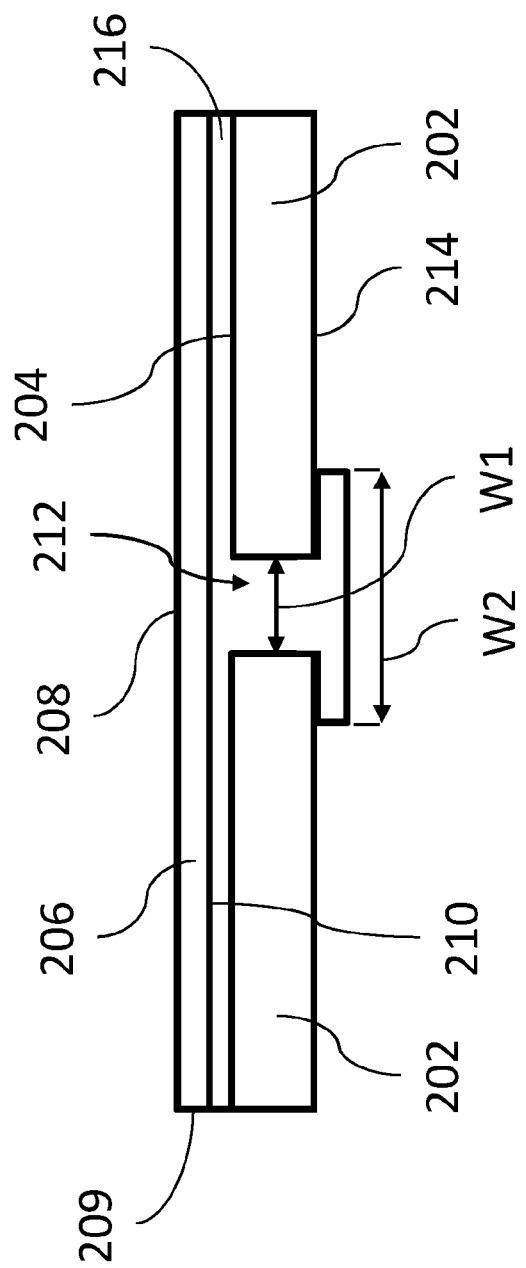
FIG. 4 is a cross-sectional view of a vehicle interior component following attachment of a glass substrate to a frame, according to one or more embodiments.
Figure 7A:
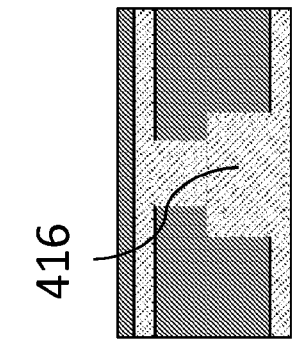
FIGS. 7A-7F are cross-sectional views of the vehicle interior components of FIGS. 6A-6E after attaching the glass substrates to the frames with a bonding material.
Figure 7B:
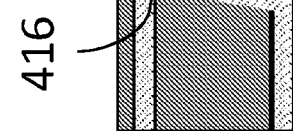
Figure 7C:
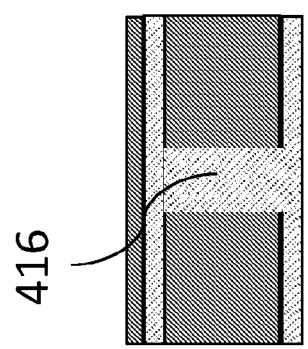
Figure 7D:
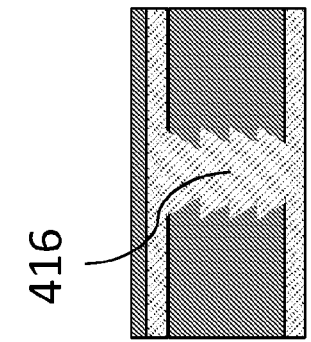
Figure 7E:
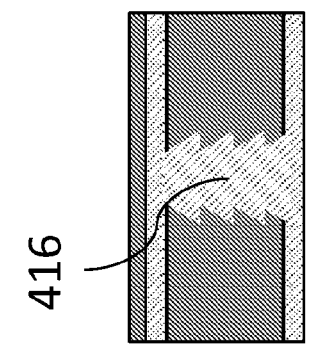
Figure 7F:
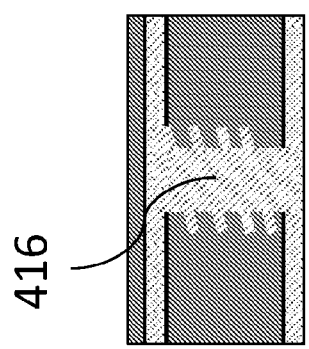

FIG. 4 shows an example of an embodiment where the bonding material 216 covers only a portion of the rear surface 214 in the vicinity of the opening 212. In particular, the bonding material 216 covers an area of the rear surface 214 that has a width W2, which is wider than the width W1 of the opening 212. While the rear surface 214 may be a rear surface of the frame, it may also be a surface within a void or space behind the support surface 208, but not actually the rear-most surface of the frame 202.

According to one or more embodiments, the openings are formed in the frame in specified areas of the frame corresponding to areas of the glass substrate having high stress. For example, when the glass substrate is applied to the frame by a cold-bending method, stresses may be induced in the glass due to the bending and the location and magnitude of the stresses in the glass may vary based on the shape (e.g., curvature) of the cold-bent glass substrate. Stresses may also be higher near edges of the glass substrate. These areas of higher stress can be sites of mechanical weakness and origin points for mechanical failure or delamination of the glass substrate. Accordingly, the location of the openings may be determined based on the final shape of the cold-bent glass substrate, so that the reinforcement provided by the interaction between the openings and the bonding material may counter-act or mitigate the weakness of these high stress regions. As using herein, "high stress" means a region of the glass substrate having a higher than average stress (relative to other regions of the glass substrate). In some cases, the high stress at least 10%, 20%, 30%, 40%, or 50% higher than the average stress. In some embodiments, the openings may be located in one or more areas corresponding to areas of the highest stress in the glass substrate.

FIGS. 5A-5D show various examples of potential locations for openings. For example, in FIG. 5A, the openings 304 are formed on the frame 302 in areas corresponding to the edges of the glass substrate 306. Likewise, in FIG. 5B, the openings 314 are formed on the frame 312 in areas corresponding to the edges of the glass substrate 306. The frame 312 of FIG. 5B is also curved such that the support surface has a convex shape. If the glass substrate 306 is cold-bent to the convex support surface, elastic forces in the glass substrate 306 will create stresses in the glass substrate due to the glass substrate wanting to return to its flat or un-bent state. Thus, the openings 314 near the edges of the glass substrate 306 can add reinforcement to resist those elastic forces. In FIG. 5C, the opening 324 is formed in a portion of the frame 322 having relatively tight curvature (i.e., small radius of curvature), which can result in higher stress in the glass substrate 306. In FIG. 5D, openings 334 are formed in various locations of the frame 332, including regions corresponding to edges of the glass substrate, regions of tight curvature, and a location corresponding to a reverse curve (i.e., inflection point of the curvature where to curvatures of opposite direction intersect). Of course, the configurations in FIGS. 5A-5D are simplified diagrams shown for illustrative purposes, and embodiments of this disclosure are not limited to these examples. The glass substrate 306 is shown to indicate the orientation of the frames 302, 312, 322, 332 with respect to the support surface 303, 313, 323, 333 to which the glass substrate 306 will be attached.

FIGS. 6A through 6F show cross-sectional views of openings according to various embodiments. The glass substrate 406 is shown to indicate the orientation of the frames 402a-402f with respect to the support surface 403 on which the glass substrate 406 will be applied. The openings can have a variety of shapes or profiles for engaging with the bonding material disposed therein. In FIG. 6A, the opening 404a of frame 402a has a constant diameter, whereas in FIGS. 6B and 6C, the openings 404b and 404c of frames 402b and 402c, respectively, have varying diameters. In FIG. 6B, the interior wall of the opening 404b is slanted, resulting in a continuously variable diameter through the depth of the opening 404b. Specifically, a region of the opening 404b that is nearest to the support surface 403 has a smaller diameter than a region of the opening 404b near the rear surface of the frame 402b. In FIG. 6C, on the other hand, the opening 404c includes two discrete regions having different diameters. FIGS. 6D-6F show openings 404d-404f, respectively, that have repeated sections of narrower and wider diameters. When the bonding material is disposed in openings 404d-404f and solidified, the bonding material can act somewhat like a screw or drywall anchor within the frames 402d-402f. FIGS. 7A-7F show the components of FIGS. 6A-6F after the openings 404a-404f have been filled with the bonding material and the glass substrates 406 have been applied to the frames 402a-402f.

The openings 404a-404f in FIGS. 6A-6F can be considered a retaining feature for retaining the bond material therein, and thus maintaining, via the bonding of the glass substrate to the bonding material, the glass substrate in a cold-bent shape on the frame. However, the openings 404a-404f are only examples of certain retain features according to one or more embodiments, and a variety of opening or through-hole shapes or geometries can be used. In addition, the openings or through-holes can have various geometric shapes, when viewed in a plan view of the support surface of the substrate. For example, the openings may be circular, as shown by openings 212 in FIG. 2, but may have other shapes, as well, included ovals, squares, rectangles, slotted, or any other suitable geometry. A slot opening, for example, has a length greater than its width, such as at least two times, five times, ten times, twenty times, fifty times, or one-hundred times the width of the opening. A slot shape may allow the bonding material to more easily enter into and fill the opening.

Figure 8:
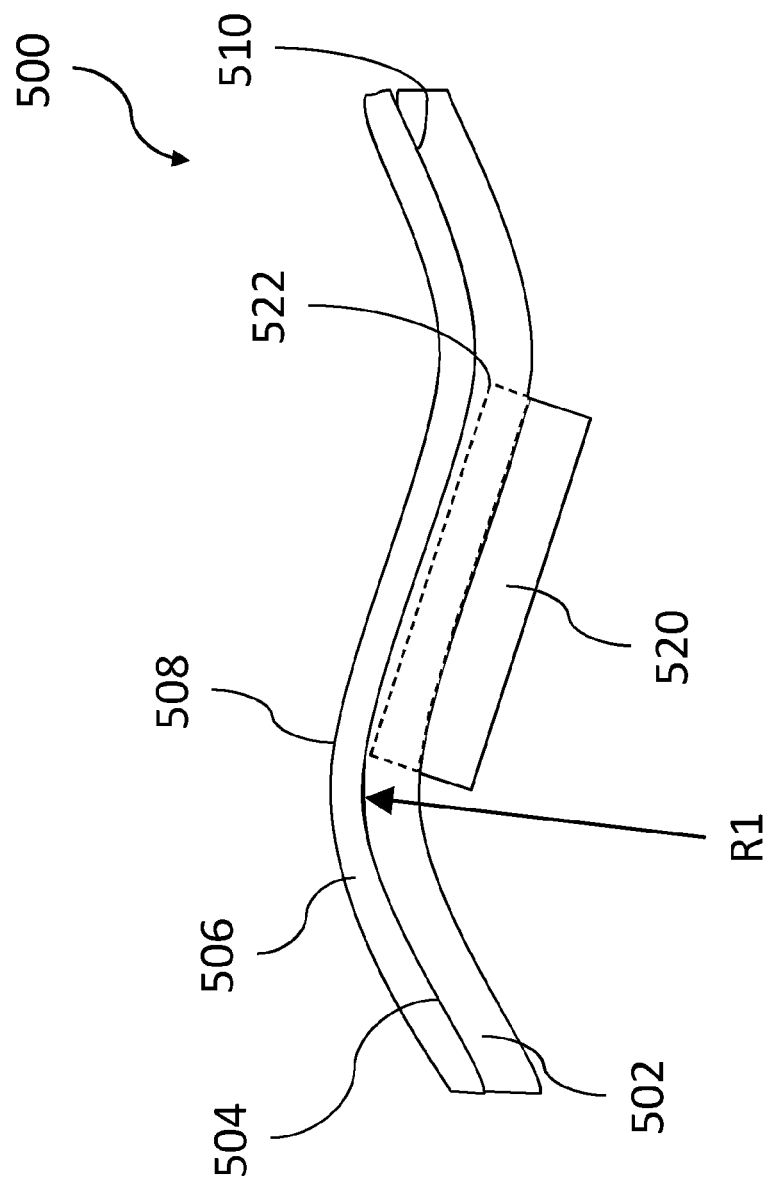
FIG. 8 is a schematic, cross-sectional view of a vehicle interior system with a display or touch panel, according to one or more embodiments.

According to some embodiments, the vehicle interior component includes one or more electronic components. The electronic component can be, for example, a display module, a touch panel, or a light source. FIG. 8 shows an embodiment of a vehicle interior component 500 with a frame 502 having a support surface 504, and a glass substrate 506 attached to the frame 502 with a bonding material or adhesive (not shown). The glass substrate 506 and the support surface 504 have one or more curved section, which may be achieved, for example, by cold-forming the glass substrate 506 to the curved support surface 504. In addition, the component 500 includes an electronic component 520, which may be a display module. The frame 502 includes a space 522 into which the electronic component 520 is placed. The electronic component can be positioned under a flat or curved portion of the glass substrate 506, and may itself be curved or flexible, in some embodiments.

The curvature of the glass substrate 506 may be the result of a flat glass substrate being cold-formed to a curved support surface 504 of the frame 502, or the result of a flat glass-and-frame laminate being cold-bent to a curved shape. In general, a glass substrate 506 is cold formed or cold bent to the desired curved shape via application of a bending force. Following cold bending, the glass substrate 506 will have a curved shape such that the first major surface 508 and second major surface 510 each include at least one curved section having a radius of curvature. The support surface 504 of frame 502 can be, for example, a convex curved surface. In such embodiments, the glass substrate 506 is bent such that second major surface 510 defines a concave shape that generally conforms to the convex curved shape of curved support surface 504, and the first major surface 508 defines a convex shape that generally matches or mirrors the convex curved shape of curved support surface 504. In such embodiments, surfaces 508 and 510 both define a first radius of curvature R1 that generally matches the radius of curvature of curved surface 504 of base 502. In some embodiments, R1 is within about 10% of the radius of the curved support surface. In particular embodiments, a bonding material (or adhesive) and the rigidity of base 502 holds the glass substrate 506 in the curved shape following removal of bending force.

During application of the bending force, a maximum temperature of glass substrate is less than a glass transition temperature of the glass material of glass substrate. In a particular embodiment, the glass substrate is not actively heated via a heating element, furnace, oven, etc. during bending, as is the case when applying hot-forming glass to a curved shape. In various embodiments, the temperature of the glass substrate is maintained below 400 degrees C., 300 degrees C., 200 degrees C. or even 100 degrees C. during application of the bending force. This cold-bending approach allows for formation of a curved glass substrate while preserving various coatings located on the glass substrate that can be damaged or destroyed at high temperatures typically associated with glass bending processes.

In general, R1 is selected based on the shape of the associated vehicle interior frame, and in general R1 is between 30 mm and 5 m. In addition, glass substrate 506 has a thickness t (e.g., an average thickness measured between surfaces 208 and 210 in FIG. 2) that is in a range from 0.05 mm to 2 mm. In specific embodiments, t is less than or equal to 1.5 mm and in more specific embodiments, t is 0.3 mm to 0.7 mm. Applicant has found that such thin glass substrates can be cold formed to a variety of curved shapes (including the relatively high curvature radii of curvature discussed herein) utilizing cold forming without breakage while at the same time providing for a high-quality cover layer for a variety of vehicle interior applications. In addition, such a thin glass substrate may deform more readily, which could potentially compensate for shape mismatches and gaps that may exist relative to curved support surface.

Figure 9B:
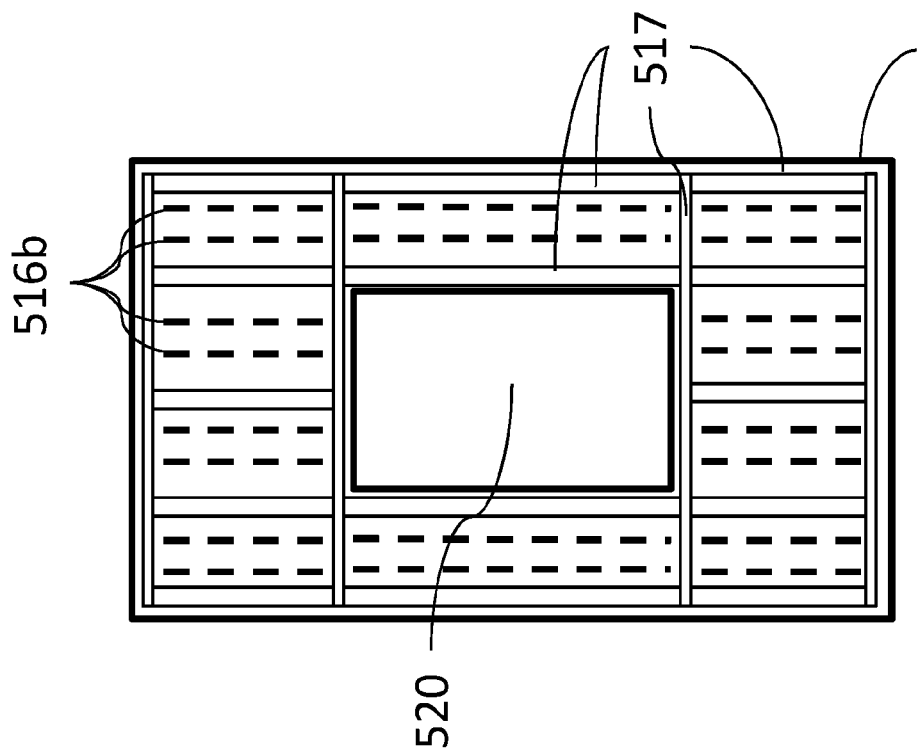
FIGS. 9A and 9B are plan views of alternative aspects of the vehicle interior system of FIG. 8, according to some embodiments.
Figure 9A:
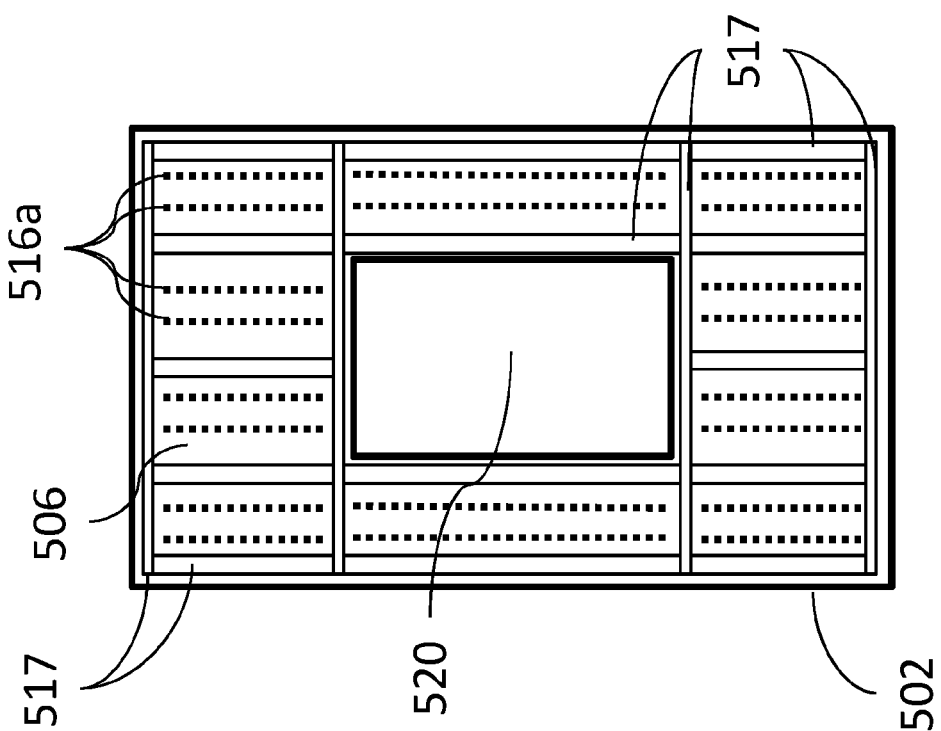

FIGS. 9A and 9B show plan views of alternative embodiments of the vehicle interior component 500 of FIG. 8. In both FIGS. 9A and 9B, the electronic component 520 can be seen through the glass substrate 506. In FIG. 9A, the frame 502 has a plurality of openings 516a, illustrated as a series of dots having, for example, a square shape or circular shape. In FIG. 9B, the frame 502 has a plurality of openings 516b that have a slotted shape. As discussed above, the slotted shape 516b may, in some embodiments, allow for the bonding material to more easily fill the openings 516b.

FIGS. 9A and 9B also show a second adhesive material 517 disposed between the frame 502 and the glass substrate 506. The second adhesive material can be a pressure sensitive adhesive, an adhesive tape, an adhesive film, or a foam. The second adhesive material 517 can include at least one of an acrylic material, a urethane material, or an olefin rubber material, for example. In some embodiments, the second adhesive material 517 can adhere the glass substrate 506 to the frame 502 in the cold-bent shape while the bonding material (or first adhesive material) is applied to the component or while the bonding material hardens or cures. As shown in FIGS. 9A and 9B, the second adhesive material 517 is applied in areas where the openings 516a, 516b are not formed. The second adhesive material 517 can define a number of regions into which the bonding material is supplied, and the second adhesive material 517 can even act as a barrier to prevent unwanted flow of the bonding material to other areas of the frame 502 or glass substrate 506 before the bonding material hardens or cures. For example, a different material (e.g., an optically clear adhesive or OCA) may be used between the electronic component 520 and the glass substrate 506, and it may be undesirable, in some embodiments, for the bonding material to enter that space. Thus, the second adhesive material 517 can block the bonding material from escaping one of the regions defined by the second adhesive material 517.

In one or more embodiments, the bonding material is chosen from a material capable of being plasma-bonded to the glass substrate. Plasma can be used for treating surfaces of various materials prior to a coating, printing or adhesion, and thus this plasma treating process will be readily available in most of manufacturing environments and easily implemented to the embodiments described herein.

In particular embodiments, the bonding material can be polydimethylsiloxane (PDMS). Specifically, a PDMS layer or structure can be placed between the glass substrate and frame, and may also filled one or more openings formed in the frame. In some embodiments, the support surface of the frame is coated with the PDMS, or the frame is encapsulated in the PDMS. Then, a surface plasma treatment of the PDMS and the second major surface of the glass substrate are performed, followed by bonding of the glass substrate to the surface plasma treated PDMS.

Regarding the surface plasma treatment, as shown in FIGS. 10A-10C, a glass substrate 606 and PDMS layer 616 are provided in FIG. 10A. PDMS has the following molecular structure:

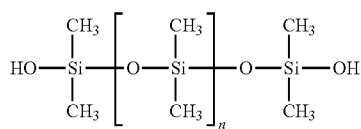

During the surface plasma treatment, the reactive silanol (Si—O—H) group 620 is generated on both the glass substrate and PDMS layer surfaces 606' and 616', respectively, as shown in FIG. 10B. The reactive silanol groups undergo condensation reactions to form strong covalent siloxane (Si—O—Si) bonds when the surface plasma treated cover glass and PDMS are brought together (i.e., glass and PDMS are in conformal contact), as shown in FIG. 10C. This bonding can be achieved during a cold-forming process in which the glass substrate is cold-bent to a desired shape, including having one or more curved regions. As a result, bonding of cover glass to a PDMS layer or structure can be achieved without any adhesive materials. Thus, the PDMS layer or structure can be incorporated into the vehicle interior component by coating the frame surface or encapsulating the frame with PDMS, followed by the surface plasma treatment and bonding in the cold forming process. This can improve existing cold forming processes that solely rely on adhesive materials to laminate and cold form a thin cover glass onto a curved structural frame.

In some embodiments, the PDMS can also be bonded to other materials, including PDMS to SU-8 bonding using oxygen plasma activation followed by aminosilane-mediated irreversible bonding method; PDMS to polyimide bonding based on a thiol-epoxy click reaction at room temperature after oxygen plasma treatment; and PDMS to plastic materials or thermoplastics using (1) oxygen plasma treatment followed by amine and epoxy functionalities at room temperature (poly(methylmethacrylate) (PMMA), polycarbonate (PC), polyimide (PI), and poly(ethylene terephthalate) (PET)), (2) oxygen plasma activation followed by aminopropyltriethoxysilane modification (PC, cyclic olefin copolymer (COC), PMMA and polystyrene (PS)), (3) plasma activation followed by aminosilane-mediated room temperature bonding (PC, PMMA, COC and PS), and (4) surface modification by plasma oxidation followed by silane reagents (tetraethyl orthosilicate or TEOS) (PMMA, PC, APET, PDMS and glass).

FIGS. 11A-11F show processes for laminating a vehicle interior component using PDMS according to some embodiments. In FIG. 11A, a curved frame 702 and PDMS layer 716 are provided and are bonded together, as shown in FIG. 11B. A flat glass substrate 706 and the PDMS layer 716 then undergo a surface plasma treatment, followed by cold-forming the glass substrate 706 to the PDMS layer 716, which will be plasma-bonded, as shown in FIG. 11C. FIGS. 11D-11F show an alternative arrangement of steps, were the glass substrate 706 and PDMS layer 716 are provided in FIG. 11D, and the PDMS layer 716 is plasma bonded to the flat glass substrate 706, as shown in FIG. 11E. Then, the bonded glass substrate 706 and PDMS layer 716 can be conformed to the curved frame 702, as shown in FIG. 11F.

Figure 12:
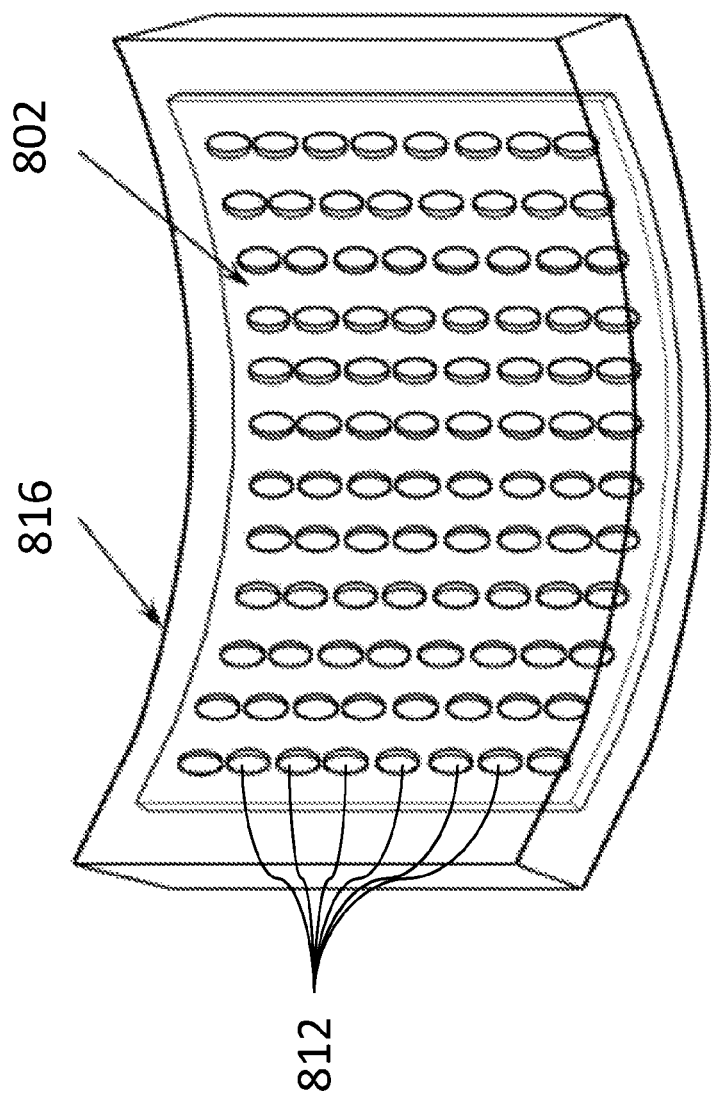
FIG. 12 is an isometric view of a frame and PDMS encapsulation layer according to some embodiments.
Figure 13A:
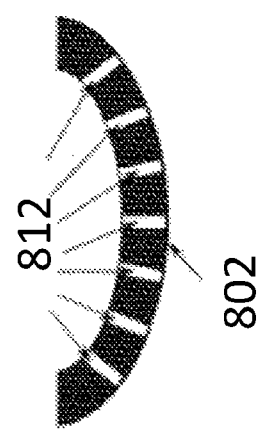
FIGS. 13A-13D are cross-sectional views of a vehicle interior component in various stages of assembly, according to some embodiments.
Figure 13B:
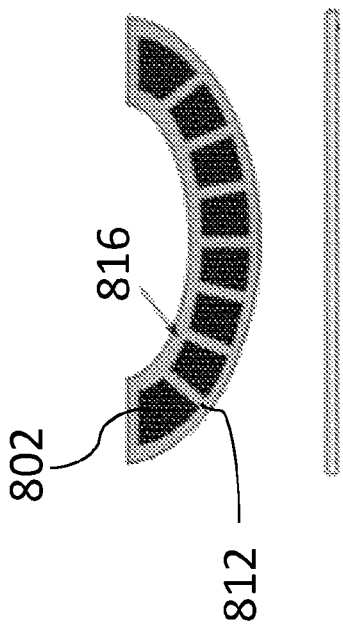
Figure 13C:
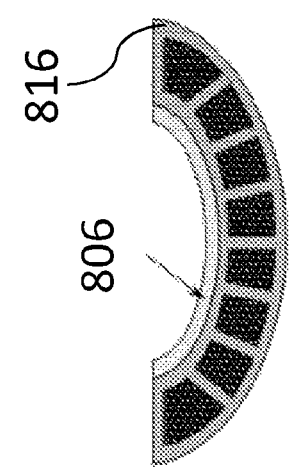
Figure 13D:
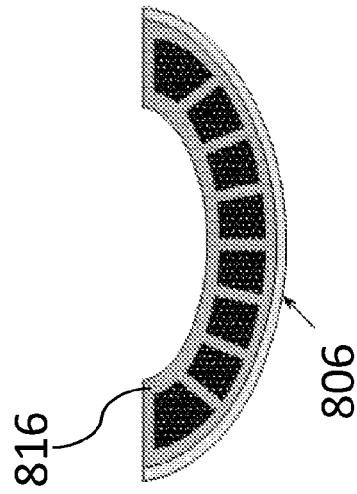

As shown in FIG. 12, the frame 802 can include a number of openings 812, and the PDMS layer 816 can encapsulate the frame 802 such that the PDMS layer 816 extends through the openings 812 and on the front and back sides of the frame 802. This is shown in FIGS. 13A-13C in schematic cross-sectional views of the frame 802 of FIG. 12, according to one or more embodiments. As shown by FIGS. 13C and 13D, the glass substrate 806 can be cold-formed onto a concave (FIG. 13C) or a convex (FIG. 13D) surface of the PDMS layer 816.

Figure 14A:
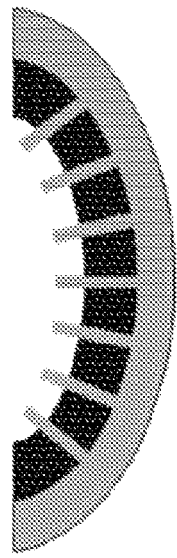
FIGS. 14A-14D are cross-sectional views of a vehicle interior component in stages of assembly, according to one or more embodiments.
Figure 14B:
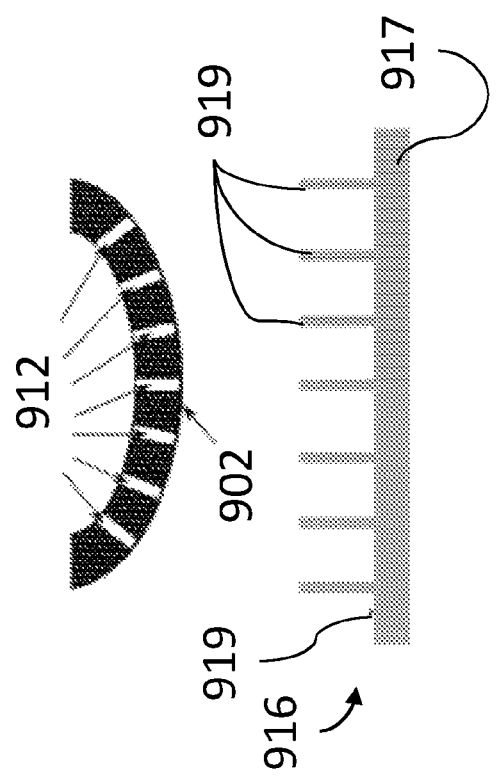
Figure 14C:
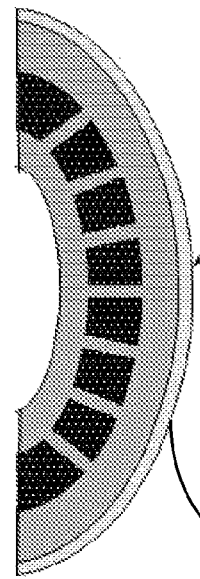
Figure 14D:
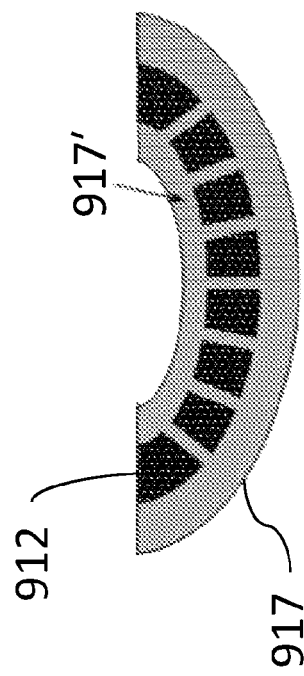

Referring to FIGS. 14A-14D, some embodiments include a PDMS structure 916 have a base 917 with a primary surface 918 and one or more raised portions 919 extending outward from the primary surface 918. The raised portions 919 are sized to fit into and/or through one or more openings 912 formed in a frame 902. The PDMS structure 916, being flexible, can be conformed to a curve shape of the frame 902, as shown in FIG. 14B, while the raised portions 919 are inserted into the openings 912. After attaching the PDMS structure 917 to the frame 912, the PDMS structure 917 is secured to the frame 912 by attaching a securing mechanism to the raised portions 919 emerging from the opposite side of the frame 902. The securing mechanism can be coating or adhesive layer, or a mechanism restraining mechanism such as a nut or pin. In some embodiments, an additional layer of PDMS 917' is added to the rear side of the frame 912, as shown in FIG. 14C. The additional layer of PDMS 917' can be plasma bonded to the PDMS structure 917 for secure attachment. A glass substrate 906 can then be added to the additional PDMS layer 917' or, as shown in FIG. 14D, to the plasma structure 917, via plasma bonding as discussed above.

In an alternative embodiment, one or more attachment mechanisms are used to aid the attachment of a PDMS layer to a frame. For example, the attachment mechanism can include a number of bolts 957 and a flexible washer sheet 958 with a number of holes 959, as shown in FIG. 15A. The bolts 957 are designed to fit through the washer sheet 958, as shown in FIG. 15B. Next, the washer sheet 958 and the heads of the bolts 957 can encased in PDMS 966, as shown in FIG. 15C. Because the washer sheet 958 and PDMS 966 are flexible, they can together be formed to a shape of a frame 956, such that the bolts 957 extend through openings 962 in the frame 956, as shown in FIGS. 15D and 15E. Finally, the bolts 957 can be secured on the rear side of the frame 956 with a retaining mechanism 977, such as a series of nuts, pins, or the like.

Methods of forming the vehicle interior components described above are also provided. In one or more embodiments, a method of forming a vehicle interior component having a cold-bent glass substrate applied to a curved frame includes providing a frame having a support surface with one or more openings formed in the support surface. The method also includes providing a glass substrate having a first major surface, a second major surface opposite the first major surface, and a minor surface between the first and second major surfaces and defining a thickness of the glass substrate. The glass substrate is positioned on the support surface with the second major surface facing the support surface. A force is applied to at least one of the glass substrate and the frame to conform the second major surface and/or the support surface to a predetermined shape having one or more curved surface regions. This conforming of the glass substrate is performed at a temperature of the glass substrate that is below the glass transition temperature of the glass substrate, thus transforming the glass substrate into a "cold-formed" or "cold-bent" state.

A bonding material or adhesive material (sometimes referred to as a "first adhesive") is supplied between the second major surface and the support surface to adhere the glass substrate to the frame. In addition, the bonding material is placed within one or more of the openings. The openings or through-holes may be strategically made in the frame to one or more areas depending on the design of the finished product, as described above. The openings may be made through a rear surface of the frame to the support surface, such that a bonding material may be applied from the rear surface side through the openings. Alternatively, a bonding material may be applied to a second major surface of the glass substrate or the support surface of the frame, before forming the glass substrate to the curved support surface. In any case, the bonding material, after a hardening or curing step, helps to hold the glass substrate in the cold-bent state. To increase the strength of the lamination, the openings provide a retaining feature for the bonding material, as described above.

In some embodiments, the method includes temporarily holding the glass substrate in the cold-bent state with one or more clips, a press, or a mold, until the bonding material is applied and cured at which time the temporary holding mechanism may release the laminated component.

EXAMPLE

A vehicle interior component was constructed using the cold forming process described herein with plasma bonding of glass to PDMS. A PDMS prepolymer (10:1 w/w) (Sylgard® 184, Dow Corning Corporation, Midland, Mich., USA) was first used to encapsulate a 1 mm thick curved black anodized aluminum structural frame (112 mm×76 mm) with through holes using a curved aluminum plate mold setup. After curing the PDMS prepolymer at 70° C. for at least 3 hours, the curved PDMS encapsulated assembly was removed from the mold setup. The curing time of PDMS prepolymer can be significantly shortened by increasing the curing temperature, for example, 150° C. for 10 minutes. Next, a 0.4 mm thick strengthened aluminosilicate glass substrate having dimensions of 155 mm by 94 mm and the curved PDMS encapsulated assembly were placed inside an RF plasma chamber (Model MPS-300; March Instruments, Inc., Concord, Calif., USA) and exposed to oxygen plasma at 100 W for 30 seconds while oxygen gas was flowing into the chamber. After removing the glass substrate and the curved PDMS encapsulated assembly from the chamber, the glass substrate and the curved PDMS encapsulated assembly were quickly brought together and the glass substrate was cold formed onto the curved PDMS encapsulated assembly using the mold setup. Although covalent siloxane bonds could be formed at room temperature, in order to ensure strong covalent siloxane bonds were formed between the surface plasma treated glass substrate and PDMS surfaces, the mold setup with the cold formed glass substrate—PDMS encapsulated assembly was placed inside an oven at 50° C. for at least an hour. After the mild heat treatment, glass substrate was successfully cold formed onto either the convex or concave side of the curved PDMS encapsulated assembly.

The glass substrate according to one or more embodiments is formed from a strengthened glass sheet (e.g., a thermally strengthened glass material, a chemically strengthened glass sheet, etc.) In such embodiments, when the glass substrate is formed from a strengthened glass material, the first and second major surfaces are under compressive stress, and thus a major surface can experience greater tensile stress during bending to a convex shape without risking fracture. This allows for the strengthened glass substrate to conform to more tightly curved surfaces.

A feature of a cold-formed glass substrate is an asymmetric surface compressive between the first major surface and the second major surface once the glass substrate has been bent to the curved shape. In such embodiments, prior to the cold-forming process or being cold-formed, the respective compressive stresses in the first major surface and the second major surface of the glass substrate are substantially equal. After cold-forming, the compressive stress on a concave major surface increases such that the compressive stress on the major surface is greater after cold-forming than before cold-forming. In contrast, a convex major surface experiences tensile stresses during bending causing a net decrease in surface compressive stress on the surface, such that the compressive stress in the surface following bending is less than the compressive stress in the surface when the glass sheet is flat.

As noted above, in addition to providing processing advantages such as eliminating expensive and/or slow heating steps, the cold-forming processes discussed herein are believed to generate curved glass articles with a variety of properties that are superior to hot-formed glass articles, particularly for vehicle interior or display cover glass applications. For example, Applicant believes that, for at least some glass materials, heating during hot-forming processes decreases optical properties of curved glass sheets, and thus, the curved glass substrates formed utilizing the cold-bending processes/systems discussed herein provide for both curved glass shapes along with improved optical qualities not believed achievable with hot-bending processes.

Further, many glass surface treatments (e.g., anti-glare coatings, anti-reflective coatings, etc.) are applied via deposition processes, such as sputtering processes that are typically ill-suited for coating curved glass articles. In addition, many surface treatments (e.g., anti-glare coatings, anti-reflective coatings, decorative coatings, etc.) also are not able to survive the high temperatures associated with hot-bending processes. Thus, in particular embodiments discussed herein, one or more surface treatments are applied to one or both of the major surfaces of the glass substrate prior to cold-bending, and the glass substrate including the surface treatment is bent to a curved shape as discussed herein. Thus, Applicant believes that the processes and systems discussed herein allow for bending of glass after one or more coating materials have been applied to the glass, in contrast to typical hot-forming processes.

The articles and methods disclosed herein allow for a glass substrate to be bent into complex shapes having more than one radius of curvature. For example, the glass substrate can be bent to a shape such that one or both of the major surfaces have both convex and concave curved sections forming an S-shaped glass substrate when viewed in cross-section, as shown in FIG. 8.

In various embodiments, a cold-formed glass substrate may have a compound curve including a major radius and a cross curvature. A complexly curved cold-formed glass substrate may have a distinct radius of curvature in two independent directions. According to one or more embodiments, a complexly curved cold-formed glass substrate may thus be characterized as having "cross curvature," where the cold-formed glass substrate is curved along an axis (i.e., a first axis) that is parallel to a given dimension and also curved along an axis (i.e., a second axis) that is perpendicular to the same dimension. The curvature of the cold-formed glass substrate and the curved display can be even more complex when a significant minimum radius is combined with a significant cross curvature, and/or depth of bend. In various embodiments, a glass substrate can have more than two curved regions with the same or differing curved shapes. In some embodiments, the glass substrate can have one or more region having a curved shape with a variable radius of curvature.

As noted above and with reference to FIG. 2, a glass substrate 206 has a thickness t that is substantially constant and is defined as a distance between a first major surface 208 and the second major surface 210. In various embodiments, t may refer to an average thickness or a maximum thickness of the glass substrate 206. In addition, glass substrate 206 includes a width W defined as a first maximum dimension of one of the first or second major surfaces orthogonal to the thickness t, and a length L1 defined as a second maximum dimension of one of the first or second surfaces orthogonal to both the thickness t and the width W. In other embodiments, W and L1 may be the average width and the average length of glass substrate 206, respectively.

In various embodiments, thickness t is 2 mm or less and specifically is 0.3 mm to 1.1 mm. For example, thickness t may be in a range from about 0.1 mm to about 1.5 mm, from about 0.15 mm to about 1.5 mm, from about 0.2 mm to about 1.5 mm, from about 0.25 mm to about 1.5 mm, from about 0.3 mm to about 1.5 mm, from about 0.35 mm to about 1.5 mm, from about 0.4 mm to about 1.5 mm, from about 0.45 mm to about 1.5 mm, from about 0.5 mm to about 1.5 mm, from about 0.55 mm to about 1.5 mm, from about 0.6 mm to about 1.5 mm, from about 0.65 mm to about 1.5 mm, from about 0.7 mm to about 1.5 mm, from about 0.1 mm to about 1.4 mm, from about 0.1 mm to about 1.3 mm, from about 0.1 mm to about 1.2 mm, from about 0.1 mm to about 1.1 mm, from about 0.1 mm to about 1.05 mm, from about 0.1 mm to about 1 mm, from about 0.1 mm to about 0.95 mm, from about 0.1 mm to about 0.9 mm, from about 0.1 mm to about 0.85 mm, from about 0.1 mm to about 0.8 mm, from about 0.1 mm to about 0.75 mm, from about 0.1 mm to about 0.7 mm, from about 0.1 mm to about 0.65 mm, from about 0.1 mm to about 0.6 mm, from about 0.1 mm to about 0.55 mm, from about 0.1 mm to about 0.5 mm, from about 0.1 mm to about 0.4 mm, or from about 0.3 mm to about 0.7 mm. In other embodiments, the thickness t falls within any one of the exact numerical ranges set forth in this paragraph.

In various embodiments, width W is in a range from 5 cm to 250 cm, from about 10 cm to about 250 cm, from about 15 cm to about 250 cm, from about 20 cm to about 250 cm, from about 25 cm to about 250 cm, from about 30 cm to about 250 cm, from about 35 cm to about 250 cm, from about 40 cm to about 250 cm, from about 45 cm to about 250 cm, from about 50 cm to about 250 cm, from about 55 cm to about 250 cm, from about 60 cm to about 250 cm, from about 65 cm to about 250 cm, from about 70 cm to about 250 cm, from about 75 cm to about 250 cm, from about 80 cm to about 250 cm, from about 85 cm to about 250 cm, from about 90 cm to about 250 cm, from about 95 cm to about 250 cm, from about 100 cm to about 250 cm, from about 110 cm to about 250 cm, from about 120 cm to about 250 cm, from about 130 cm to about 250 cm, from about 140 cm to about 250 cm, from about 150 cm to about 250 cm, from about 5 cm to about 240 cm, from about 5 cm to about 230 cm, from about 5 cm to about 220 cm, from about 5 cm to about 210 cm, from about 5 cm to about 200 cm, from about 5 cm to about 190 cm, from about 5 cm to about 180 cm, from about 5 cm to about 170 cm, from about 5 cm to about 160 cm, from about 5 cm to about 150 cm, from about 5 cm to about 140 cm, from about 5 cm to about 130 cm, from about 5 cm to about 120 cm, from about 5 cm to about 110 cm, from about 5 cm to about 110 cm, from about 5 cm to about 100 cm, from about 5 cm to about 90 cm, from about 5 cm to about 80 cm, or from about 5 cm to about 75 cm. In other embodiments, W falls within any one of the exact numerical ranges set forth in this paragraph.

In various embodiments, length L1 is in a range from about 5 cm to about 250 cm, from about 10 cm to about 250 cm, from about 15 cm to about 250 cm, from about 20 cm to about 250 cm, from about 25 cm to about 250 cm, from about 30 cm to about 250 cm, from about 35 cm to about 250 cm, from about 40 cm to about 250 cm, from about 45 cm to about 250 cm, from about 50 cm to about 250 cm, from about 55 cm to about 250 cm, from about 60 cm to about 250 cm, from about 65 cm to about 250 cm, from about 70 cm to about 250 cm, from about 75 cm to about 250 cm, from about 80 cm to about 250 cm, from about 85 cm to about 250 cm, from about 90 cm to about 250 cm, from about 95 cm to about 250 cm, from about 100 cm to about 250 cm, from about 110 cm to about 250 cm, from about 120 cm to about 250 cm, from about 130 cm to about 250 cm, from about 140 cm to about 250 cm, from about 150 cm to about 250 cm, from about 5 cm to about 240 cm, from about 5 cm to about 230 cm, from about 5 cm to about 220 cm, from about 5 cm to about 210 cm, from about 5 cm to about 200 cm, from about 5 cm to about 190 cm, from about 5 cm to about 180 cm, from about 5 cm to about 170 cm, from about 5 cm to about 160 cm, from about 5 cm to about 150 cm, from about 5 cm to about 140 cm, from about 5 cm to about 130 cm, from about 5 cm to about 120 cm, from about 5 cm to about 110 cm, from about 5 cm to about 100 cm, from about 5 cm to about 90 cm, from about 5 cm to about 80 cm, or from about 5 cm to about 75 cm. In other embodiments, L1 falls within any one of the exact numerical ranges set forth in this paragraph.

In various embodiments, one or more radius of curvature (e.g., R1 shown in FIG. 8) of glass substrate 502 is about 20 mm or greater, about 40 mm or greater or about 60 mm or greater. For example, R1 may be in a range from about 20 mm to about 10,000 mm, from about 30 mm to about 10,000 mm, from about 40 mm to about 10,000 mm, from about 50 mm to about 10,000 mm, from about 60 mm to about 10,000 mm, from about 70 mm to about 10,000 mm, from about 80 mm to about 10,000 mm, from about 90 mm to about 10,000 mm, from about 100 mm to about 10,000 mm, from about 120 mm to about 10,000 mm, from about 140 mm to about 10,000 mm, from about 150 mm to about 10,000 mm, from about 160 mm to about 10,000 mm, from about 180 mm to about 10,000 mm, from about 200 mm to about 10,000 mm, from about 220 mm to about 10,000 mm, from about 240 mm to about 10,000 mm, from about 250 mm to about 10,000 mm, from about 260 mm to about 10,000 mm, from about 270 mm to about 10,000 mm, from about 280 mm to about 10,000 mm, from about 290 mm to about 10,000 mm, from about 300 mm to about 10,000 mm, from about 350 mm to about 10,000 mm, from about 400 mm to about 10,000 mm, from about 450 mm to about 10,000 mm, from about 500 mm to about 10,000 mm, from about 550 mm to about 10,000 mm, from about 600 mm to about 10,000 mm, from about 650 mm to about 10,000 mm, from about 700 mm to about 10,000 mm, from about 750 mm to about 10,000 mm, from about 800 mm to about 10,000 mm, from about 900 mm to about 10,000 mm, from about 950 mm to about 10,000 mm, from about 1000 mm to about 10,000 mm, from about 1250 mm to about 10,000 mm, from about 1500 mm to about 10,000 mm, from about 2000 mm to about 10,000 mm, from about 3000 mm to about 10,000 mm, from about 4000 mm to about 10,000 mm, from about 5000 mm to about 10,000 mm, from about 7250 mm to about 10,000 mm, from about 20 mm to about 9000 mm, from about 20 mm to about 8000 mm, from about 20 mm to about 7000 mm, from about 20 mm to about 6000 mm, from about 20 mm to about 5000 mm, from about 20 mm to about 4000 mm, from about 20 mm to about 3000 mm, from about 20 mm to about 2500 mm, from about 20 mm to about 2250 mm, from about 20 mm to about 2000 mm, from about 20 mm to about 1750 mm, from about 20 mm to about 1700 mm, from about 20 mm to about 1600 mm, from about 20 mm to about 1400 mm, from about 20 mm to about 1300 mm, from about 20 mm to about 1200 mm, from about 20 mm to about 1100 mm, from about 20 mm to about 1000 mm, from about 20 mm to about 950 mm, from about 20 mm to about 900 mm, from about 20 mm to about 850 mm, from about 20 mm to about 800 mm, from about 20 mm to about 750 mm, from about 20 mm to about 700 mm, from about 20 mm to about 650 mm, from about 20 mm to about 200 mm, from about 20 mm to about 550 mm, from about 20 mm to about 500 mm, from about 20 mm to about 450 mm, from about 20 mm to about 400 mm, from about 20 mm to about 350 mm, from about 20 mm to about 300 mm, or from about 20 mm to about 250 mm. In other embodiments, R1 falls within any one of the exact numerical ranges set forth in this paragraph.

According to embodiments discussed herein, a glass substrate of a vehicle interior component can include one or more regions intended to show a display (e.g., an electronic display). In addition, a glass substrate according to some embodiments can be curved in multiple regions of the glass substrate and in multiple directions (i.e., the glass substrate can be curved about different axes that may or may not be parallel). Accordingly, shapes and forms of the possible embodiments are not limited to the examples shown herein. The glass substrate can be shaped to have a complex surface including multiple different shapes including one or more flat sections, one or more conical sections, one or more cylindrical sections, one or more spherical sections, etc.

The various embodiments of the vehicle interior system may be incorporated into vehicles such as trains, automobiles (e.g., cars, trucks, buses and the like), sea craft (boats, ships, submarines, and the like), and aircraft (e.g., drones, airplanes, jets, helicopters and the like).

Strengthened Glass Properties

As noted above, a glass substrate 206 of some embodiments may be strengthened. In one or more embodiments, the glass substrate may be strengthened to include compressive stress that extends from a surface to a depth of compression (DOC). The compressive stress regions are balanced by a central portion exhibiting a tensile stress. At the DOC, the stress crosses from a positive (compressive) stress to a negative (tensile) stress.

In various embodiments, the glass substrate 206 may be strengthened mechanically by utilizing a mismatch of the coefficient of thermal expansion between portions of the article to create a compressive stress region and a central region exhibiting a tensile stress. In some embodiments, the glass substrate may be strengthened thermally by heating the glass to a temperature above the glass transition point and then rapidly quenching.

In various embodiments, glass substrate 206 may be chemically strengthened by ion exchange. In the ion exchange process, ions at or near the surface of the glass substrate are replaced by—or exchanged with—larger ions having the same valence or oxidation state. In those embodiments in which the glass substrate comprises an alkali aluminosilicate glass, ions in the surface layer of the article and the larger ions are monovalent alkali metal cations, such as $Li^+$, $Na^+$, $K^+$, $Rb^+$, and $Cs^+$. Alternatively, monovalent cations in the surface layer may be replaced with monovalent cations other than alkali metal cations, such as $Ag^+$ or the like. In such embodiments, the monovalent ions (or cations) exchanged into the glass substrate generate a stress.

Ion exchange processes are typically carried out by immersing a glass substrate in a molten salt bath (or two or more molten salt baths) containing the larger ions to be exchanged with the smaller ions in the glass substrate. It should be noted that aqueous salt baths may also be utilized. In addition, the composition of the bath(s) may include more than one type of larger ions (e.g., Na+ and K+) or a single larger ion. It will be appreciated by those skilled in the art that parameters for the ion exchange process, including, but not limited to, bath composition and temperature, immersion time, the number of immersions of the glass substrate in a salt bath (or baths), use of multiple salt baths, additional steps such as annealing, washing, and the like, are generally determined by the composition of the glass substrate (including the structure of the article and any crystalline phases present) and the desired DOC and CS of the glass substrate that results from strengthening. Exemplary molten bath compositions may include nitrates, sulfates, and chlorides of the larger alkali metal ion. Typical nitrates include $KNO_3$, $NaNO_3$, $LiNO_3$, $NaSO_4$ and combinations thereof. The temperature of the molten salt bath typically is in a range from about 380° C. up to about 450° C., while immersion times range from about 15 minutes up to about 100 hours depending on glass substrate thickness, bath temperature and glass (or monovalent ion) diffusivity. However, temperatures and immersion times different from those described above may also be used.

In one or more embodiments, the glass substrates may be immersed in a molten salt bath of 100% $NaNO_3$, 100% $KNO_3$, or a combination of $NaNO_3$ and $KNO_3$ having a temperature from about 370° C. to about 480° C. In some embodiments, the glass substrate may be immersed in a molten mixed salt bath including from about 5% to about 90% $KNO_3$ and from about 10% to about 95% $NaNO_3$. In one or more embodiments, the glass substrate may be immersed in a second bath, after immersion in a first bath. The first and second baths may have different compositions and/or temperatures from one another. The immersion times in the first and second baths may vary. For example, immersion in the first bath may be longer than the immersion in the second bath.

In one or more embodiments, the glass substrate may be immersed in a molten, mixed salt bath including $NaNO_3$ and $KNO_3$ (e.g., 49%/51%, 50%/50%, 51%/49%) having a temperature less than about 420° C. (e.g., about 400° C. or about 380° C.). for less than about 5 hours, or even about 4 hours or less.

Ion exchange conditions can be tailored to provide a "spike" or to increase the slope of the stress profile at or near the surface of the resulting glass substrate. The spike may result in a greater surface CS value. This spike can be achieved by a single bath or multiple baths, with the bath(s) having a single composition or mixed composition, due to the unique properties of the glass compositions used in the glass substrates described herein.

In one or more embodiments, where more than one monovalent ion is exchanged into the glass substrate, the different monovalent ions may exchange to different depths within the glass substrate (and generate different magnitudes stresses within the glass substrate at different depths). The resulting relative depths of the stress-generating ions can be determined and cause different characteristics of the stress profile.

CS is measured using those means known in the art, such as by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured by those methods that are known in the art, such as fiber and four-point bend methods, both of which are described in ASTM standard C770-98 (2013), entitled "Standard Test Method for Measurement of Glass Stress-Optical Coefficient," the contents of which are incorporated herein by reference in their entirety, and a bulk cylinder method. As used herein CS may be the "maximum compressive stress" which is the highest compressive stress value measured within the compressive stress layer. In some embodiments, the maximum compressive stress is located at the surface of the glass substrate. In other embodiments, the maximum compressive stress may occur at a depth below the surface, giving the compressive profile the appearance of a "buried peak."

DOC may be measured by FSM or by a scattered light polariscope (SCALP) (such as the SCALP-04 scattered light polariscope available from Glasstress Ltd., located in Tallinn Estonia), depending on the strengthening method and conditions. When the glass substrate is chemically strengthened by an ion exchange treatment, FSM or SCALP may be used depending on which ion is exchanged into the glass substrate. Where the stress in the glass substrate is generated by exchanging potassium ions into the glass substrate, FSM is used to measure DOC. Where the stress is generated by exchanging sodium ions into the glass substrate, SCALP is used to measure DOC. Where the stress in the glass substrate is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth of potassium ions in such glass substrates is measured by FSM. Central tension or CT is the maximum tensile stress and is measured by SCALP.

In one or more embodiments, the glass substrate may be strengthened to exhibit a DOC that is described as a fraction of the thickness t of the glass substrate (as described herein). For example, in one or more embodiments, the DOC may be equal to or greater than about 0.05t, equal to or greater than about 0.1t, equal to or greater than about 0.11t, equal to or greater than about 0.12t, equal to or greater than about 0.13t, equal to or greater than about 0.14 t, equal to or greater than about 0.15t, equal to or greater than about 0.16t, equal to or greater than about 0.17t, equal to or greater than about 0.18t, equal to or greater than about 0.19t, equal to or greater than about 0.2t, equal to or greater than about 0.21t. In some embodiments, the DOC may be in a range from about 0.08t to about 0.25t, from about 0.09t to about 0.25t, from about 0.18t to about 0.25t, from about 0.11t to about 0.25t, from about 0.12t to about 0.25f, from about 0.13t to about 0.25t, from about 0.14t to about 0.25t, from about 0.15t to about 0.25t, from about 0.08t to about 0.24t, from about 0.08t to about 0.23t, from about 0.08 t to about 0.22t, from about 0.08t to about 0.21t, from about 0.08t to about 0.2t, from about 0.08t to about 0.19t, from about 0.08t to about 0.18t, from about 0.08t to about 0.17t, from about 0.08t to about 0.16t, or from about 0.08t to about 0.15t. In some instances, the DOC may be about 20 µm or less. In one or more embodiments, the DOC may be about 40 µm or greater (e.g., from about 40 µm to about 300 µm, from about 50 µm to about 300 µm, from about 60 µm to about 300 µm, from about 70 µm to about 300 µm, from about 80 µm to about 300 µm, from about 90 µm to about 300 µm, from about 100 µm to about 300 µm, from about 110 µm to about 300 µm, from about 120 µm to about 300 µm, from about 140 µm to about 300 µm, from about 150 µm to about 300 µm, from about 40 µm to about 290 µm, from about 40 µm to about 280 µm, from about 40 µm to about 260 µm, from about 40 µm to about 250 µm, from about 40 µm to about 240 µm, from about 40 µm to about 230 µm, from about 40 µm to about 220 µm, from about 40 µm to about 210 µm, from about 40 µm to about 200 µm, from about 40 µm to about 180 µm, from about 40 µm to about 160 µm, from about 40 µm to about 150 µm, from about 40 µm to about 140 µm, from about 40 µm to about 130 µm, from about 40 µm to about 120 µm, from about 40 µm to about 110 µm, or from about 40 µm to about 100 µm. In other embodiments, DOC falls within any one of the exact numerical ranges set forth in this paragraph.

In one or more embodiments, the strengthened glass substrate may have a CS (which may be found at the surface or a depth within the glass substrate) of about 200 MPa or greater, 300 MPa or greater, 400 MPa or greater, about 500 MPa or greater, about 600 MPa or greater, about 700 MPa or greater, about 800 MPa or greater, about 900 MPa or greater, about 930 MPa or greater, about 1000 MPa or greater, or about 1050 MPa or greater.

In one or more embodiments, the strengthened glass substrate may have a maximum tensile stress or central tension (CT) of about 20 MPa or greater, about 30 MPa or greater, about 40 MPa or greater, about 45 MPa or greater, about 50 MPa or greater, about 60 MPa or greater, about 70 MPa or greater, about 75 MPa or greater, about 80 MPa or greater, or about 85 MPa or greater. In some embodiments, the maximum tensile stress or central tension (CT) may be in a range from about 40 MPa to about 100 MPa. In other embodiments, CS falls within the exact numerical ranges set forth in this paragraph.

Glass Compositions

Suitable glass compositions for use in glass substrate 134 include soda lime glass, aluminosilicate glass, borosilicate glass, boroaluminosilicate glass, alkali-containing aluminosilicate glass, alkali-containing borosilicate glass, and alkali-containing boroaluminosilicate glass.

Unless otherwise specified, the glass compositions disclosed herein are described in mole percent (mol %) as analyzed on an oxide basis.

In one or more embodiments, the glass composition may include $SiO_2$ in an amount in a range from about 66 mol % to about 80 mol %, from about 67 mol % to about 80 mol %, from about 68 mol % to about 80 mol %, from about 69 mol % to about 80 mol %, from about 70 mol % to about 80 mol %, from about 72 mol % to about 80 mol %, from about 65 mol % to about 78 mol %, from about 65 mol % to about 76 mol %, from about 65 mol % to about 75 mol %, from about 65 mol % to about 74 mol %, from about 65 mol % to about 72 mol %, or from about 65 mol % to about 70 mol %, and all ranges and sub-ranges therebetween.

In one or more embodiments, the glass composition includes $Al_2O_3$ in an amount greater than about 4 mol %, or greater than about 5 mol %. In one or more embodiments, the glass composition includes $Al_2O_3$ in a range from greater than about 7 mol % to about 15 mol %, from greater than about 7 mol % to about 14 mol %, from about 7 mol % to about 13 mol %, from about 4 mol % to about 12 mol %, from about 7 mol % to about 11 mol %, from about 8 mol % to about 15 mol %, from about 9 mol % to about 15 mol %, from about 10 mol % to about 15 mol %, from about 11 mol % to about 15 mol %, or from about 12 mol % to about 15 mol %, and all ranges and sub-ranges therebetween. In one or more embodiments, the upper limit of $Al_2O_3$ may be about 14 mol %, 14.2 mol %, 14.4 mol %, 14.6 mol %, or 14.8 mol %.

In one or more embodiments, the glass article is described as an aluminosilicate glass article or including an aluminosilicate glass composition. In such embodiments, the glass composition or article formed therefrom includes $SiO_2$ and $Al_2O_3$ and is not a soda lime silicate glass. In this regard, the glass composition or article formed therefrom includes $Al_2O_3$ in an amount of about 2 mol % or greater, 2.25 mol % or greater, 2.5 mol % or greater, about 2.75 mol % or greater, about 3 mol % or greater.

In one or more embodiments, the glass composition comprises $B_2O_3$ (e.g., about 0.01 mol % or greater). In one or more embodiments, the glass composition comprises $B_2O_3$ in an amount in a range from about 0 mol % to about 5 mol %, from about 0 mol % to about 4 mol %, from about 0 mol % to about 3 mol %, from about 0 mol % to about 2 mol %, from about 0 mol % to about 1 mol %, from about 0 mol % to about 0.5 mol %, from about 0.1 mol % to about 5 mol %, from about 0.1 mol % to about 4 mol %, from about 0.1 mol % to about 3 mol %, from about 0.1 mol % to about 2 mol %, from about 0.1 mol % to about 1 mol %, from about 0.1 mol % to about 0.5 mol %, and all ranges and sub-ranges therebetween. In one or more embodiments, the glass composition is substantially free of $B_2O_3$.

As used herein, the phrase "substantially free" with respect to the components of the composition means that the component is not actively or intentionally added to the composition during initial batching, but may be present as an impurity in an amount less than about 0.001 mol %.

In one or more embodiments, the glass composition optionally comprises $P_2O_5$ (e.g., about 0.01 mol % or greater). In one or more embodiments, the glass composition comprises a non-zero amount of $P_2O_5$ up to and including 2 mol %, 1.5 mol %, 1 mol %, or 0.5 mol %. In one or more embodiments, the glass composition is substantially free of $P_2O_5$.

In one or more embodiments, the glass composition may include a total amount of $R_2O$ (which is the total amount of alkali metal oxide such as $Li_2O$, $Na_2O$, $K_2O$, $Rb_2O$, and $Cs_2O$) that is greater than or equal to about 8 mol %, greater than or equal to about 10 mol %, or greater than or equal to about 12 mol %. In some embodiments, the glass composition includes a total amount of $R_2O$ in a range from about 8 mol % to about 20 mol %, from about 8 mol % to about 18 mol %, from about 8 mol % to about 16 mol %, from about 8 mol % to about 14 mol %, from about 8 mol % to about 12 mol %, from about 9 mol % to about 20 mol %, from about 10 mol % to about 20 mol %, from about 11 mol % to about 20 mol %, from about 12 mol % to about 20 mol %, from about 13 mol % to about 20 mol %, from about 10 mol % to about 14 mol %, or from about 11 mol % to about 13 mol %, and all ranges and sub-ranges therebetween. In one or more embodiments, the glass composition may be substantially free of $Rb_2O$, $Cs_2O$ or both $Rb_2O$ and $Cs_2O$. In one or more embodiments, the $R_2O$ may include the total amount of $Li_2O$, $Na_2O$ and $K_2O$ only. In one or more embodiments, the glass composition may comprise at least one alkali metal oxide selected from $Li_2O$, $Na_2O$ and $K_2O$, wherein the alkali metal oxide is present in an amount greater than about 8 mol % or greater.

In one or more embodiments, the glass composition comprises $Na_2O$ in an amount greater than or equal to about 8 mol %, greater than or equal to about 10 mol %, or greater than or equal to about 12 mol %. In one or more embodiments, the composition includes $Na_2O$ in a range from about from about 8 mol % to about 20 mol %, from about 8 mol % to about 18 mol %, from about 8 mol % to about 16 mol %, from about 8 mol % to about 14 mol %, from about 8 mol % to about 12 mol %, from about 9 mol % to about 20 mol %, from about 10 mol % to about 20 mol %, from about 11 mol % to about 20 mol %, from about 12 mol % to about 20 mol %, from about 13 mol % to about 20 mol %, from about 10 mol % to about 14 mol %, or from 11 mol % to about 16 mol %, and all ranges and sub-ranges therebetween.

In one or more embodiments, the glass composition includes less than about 4 mol % $K_2O$, less than about 3 mol % $K_2O$, or less than about 1 mol % $K_2O$. In some instances, the glass composition may include $K_2O$ in an amount in a range from about 0 mol % to about 4 mol %, from about 0 mol % to about 3.5 mol %, from about 0 mol % to about 3 mol %, from about 0 mol % to about 2.5 mol %, from about 0 mol % to about 2 mol %, from about 0 mol % to about 1.5 mol %, from about 0 mol % to about 1 mol %, from about 0 mol % to about 0.5 mol %, from about 0 mol % to about 0.2 mol %, from about 0 mol % to about 0.1 mol %, from about 0.5 mol % to about 4 mol %, from about 0.5 mol % to about 3.5 mol %, from about 0.5 mol % to about 3 mol %, from about 0.5 mol % to about 2.5 mol %, from about 0.5 mol % to about 2 mol %, from about 0.5 mol % to about 1.5 mol %, or from about 0.5 mol % to about 1 mol %, and all ranges and sub-ranges therebetween. In one or more embodiments, the glass composition may be substantially free of $K_2O$.

In one or more embodiments, the glass composition is substantially free of $Li_2O$.

In one or more embodiments, the amount of $Na_2O$ in the composition may be greater than the amount of $Li_2O$. In some instances, the amount of $Na_2O$ may be greater than the combined amount of $Li_2O$ and $K_2O$. In one or more alternative embodiments, the amount of $Li_2O$ in the composition may be greater than the amount of $Na_2O$ or the combined amount of $Na_2O$ and $K_2O$.

In one or more embodiments, the glass composition may include a total amount of RO (which is the total amount of alkaline earth metal oxide such as CaO, MgO, BaO, ZnO and SrO) in a range from about 0 mol % to about 2 mol %. In some embodiments, the glass composition includes a non-zero amount of RO up to about 2 mol %. In one or more embodiments, the glass composition comprises RO in an amount from about 0 mol % to about 1.8 mol %, from about 0 mol % to about 1.6 mol %, from about 0 mol % to about 1.5 mol %, from about 0 mol % to about 1.4 mol %, from about 0 mol % to about 1.2 mol %, from about 0 mol % to about 1 mol %, from about 0 mol % to about 0.8 mol %, from about 0 mol % to about 0.5 mol %, and all ranges and sub-ranges therebetween.

In one or more embodiments, the glass composition includes CaO in an amount less than about 1 mol %, less than about 0.8 mol %, or less than about 0.5 mol %. In one or more embodiments, the glass composition is substantially free of CaO.

In some embodiments, the glass composition comprises MgO in an amount from about 0 mol % to about 7 mol %, from about 0 mol % to about 6 mol %, from about 0 mol % to about 5 mol %, from about 0 mol % to about 4 mol %, from about 0.1 mol % to about 7 mol %, from about 0.1 mol % to about 6 mol %, from about 0.1 mol % to about 5 mol %, from about 0.1 mol % to about 4 mol %, from about 1 mol % to about 7 mol %, from about 2 mol % to about 6 mol %, or from about 3 mol % to about 6 mol %, and all ranges and sub-ranges therebetween.

In one or more embodiments, the glass composition comprises $ZrO_2$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises $ZrO_2$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

In one or more embodiments, the glass composition comprises $SnO_2$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises $SnO_2$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

In one or more embodiments, the glass composition may include an oxide that imparts a color or tint to the glass articles. In some embodiments, the glass composition includes an oxide that prevents discoloration of the glass article when the glass article is exposed to ultraviolet radiation. Examples of such oxides include, without limitation oxides of: Ti, V, Cr, Mn, Fe, Co, Ni, Cu, Ce, W, and Mo.

In one or more embodiments, the glass composition includes Fe expressed as $Fe_2O_3$, wherein Fe is present in an amount up to (and including) about 1 mol %. In some embodiments, the glass composition is substantially free of Fe. In one or more embodiments, the glass composition comprises $Fe_2O_3$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises $Fe_2O_3$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

Where the glass composition includes $TiO_2$, $TiO_2$ may be present in an amount of about 5 mol % or less, about 2.5 mol % or less, about 2 mol % or less or about 1 mol % or less. In one or more embodiments, the glass composition may be substantially free of $TiO_2$.

An exemplary glass composition includes $SiO_2$ in an amount in a range from about 65 mol % to about 75 mol %, $Al_2O_3$ in an amount in a range from about 8 mol % to about 14 mol %, $Na_2O$ in an amount in a range from about 12 mol % to about 17 mol %, $K_2O$ in an amount in a range of about 0 mol % to about 0.2 mol %, and MgO in an amount in a range from about 1.5 mol % to about 6 mol %. Optionally, $SnO_2$ may be included in the amounts otherwise disclosed herein. It should be understood, that while the preceding glass composition paragraphs express approximate ranges, in other embodiments, glass substrate 134 may be made from any glass composition falling with any one of the exact numerical ranges discussed above.

Aspect (1) pertains to a vehicle interior component comprising: a frame comprising a support surface and an opening formed in the support surface; a glass substrate comprising a first major surface, a second major surface facing the support surface, and a minor surface between the first and second major surfaces and defining a thickness of the glass substrate; and a first adhesive at least partially disposed in the opening and adhering the glass substrate to the frame, wherein the first adhesive and the opening are configured to act in concert to prevent delamination of the vehicle interior component.

Aspect (2) pertains to the vehicle interior component of Aspect (1), wherein the first adhesive is disposed between the support surface and the glass substrate and disposed within the opening.

Aspect (3) pertains to the vehicle interior component of Aspect (1), wherein the first adhesive is disposed within one or more openings formed in the support surface, but is not disposed in areas of the support surface where the one or more openings are not formed.

Aspect (4) pertains to the vehicle interior component of any one of Aspects (1) through (3), wherein the glass substrate is a cold-formed glass substrate.

Aspect (5) pertains to the vehicle interior component of any one of Aspects (1) through (4), wherein the second major surface is conformed to a shape of the support surface.

Aspect (6) pertains to the vehicle interior component of any one of Aspects (1) through (5), wherein the support surface comprises a curved support surface.

Aspect (7) pertains to the vehicle interior component of Aspect (6), wherein the second major surface comprises a curved substrate surface in conformance with the curved support surface.

Aspect (8) pertains to the vehicle interior component of Aspect (7), wherein the curved support surface comprises a first radius of curvature and the curved substrate surface comprises a second radius of curvature that is within 10% of the first radius of curvature.

Aspect (9) pertains to the vehicle interior component of Aspect (8), wherein the second radius of curvature is within 5% or within 1% of the first radius of curvature.

Aspect (10) pertains to the vehicle interior component of any one of Aspects (7) through (9), wherein the curved substrate surface comprises at least one of a concave surface and a convex surface.

Aspect (11) pertains to the vehicle interior component of any one of Aspects (1) through (10), wherein the second major surface comprises a compound curvature.

Aspect (12) pertains to the vehicle interior component of any one of Aspects (1) through (11), wherein the glass substrate is complexly curved.

Aspect (13) pertains to the vehicle interior component of any one of Aspects (4) through (12), wherein the cold-formed glass substrate is formed into a curved shape at a temperature below the glass transition temperate of the glass substrate.

Aspect (14) pertains to the vehicle interior component of any one of Aspects (1) through (13), wherein the opening comprises a retaining feature.

Aspect (15) pertains to the vehicle interior component of Aspect (14), wherein the opening comprises a first portion comprising a first width in a first direction and a second portion comprising a second width in the first direction, the second width being different than the first width, and wherein the first portion is disposed between the second portion and the support surface.

Aspect (16) pertains to the vehicle interior component of Aspect (15), wherein the second width is greater than the first width.

Aspect (17) pertains to the vehicle interior component of any one of Aspects (14) through (16), wherein the retaining feature comprises the first and second portions.

Aspect (18) pertains to the vehicle interior component of any one of Aspects (15) through (17), wherein the first portion has a first shape defined by a first interior wall of the opening, and the second portion has a second shape defined by a second interior wall of the opening, the first shape being different in size or shape than the second shape.

Aspect (19) pertains to the vehicle interior component of any one of Aspects (16) through (18), wherein the first adhesive is disposed in the first and second portions of the opening.

Aspect (20) pertains to the vehicle interior component of any one of Aspects (1) through (19), wherein the opening extends through the support surface to a void behind the support surface such that the support surface separates the void from the glass substrate, and wherein the first adhesive is disposed in at least a portion of the void.

Aspect (21) pertains to the vehicle interior component of Aspect (20), wherein the portion of the void in which the first adhesive is disposed has a third width in the first direction that is larger than the first width of the opening.

Aspect (22) pertains to the vehicle interior component of any one of Aspects (1) through (21), wherein the opening is disposed opposite to at least one of an edge region of the second major surface and a curved portion of the second major surface.

Aspect (23) pertains to the vehicle interior component of any one of Aspects (1) through (22), wherein the opening is disposed opposite to a region of the second major surface that comprises a bending-induced stress.

Aspect (24) pertains to the vehicle interior component of any one of Aspects (1) through (23), wherein the first adhesive comprises at least one of an epoxy, a silicone material, an acrylic, a cyanoacrylate, a urethane, or an epoxy acrylate.

Aspect (25) pertains to the vehicle interior component of any one of Aspects (1) through (23), wherein the first adhesive comprises polydimethylsiloxane and the glass substrate is plasma-bonded to the polydimethylsiloxane.

Aspect (26) pertains to the vehicle interior component of Aspect (25), wherein the polydimethylsiloxane coats the support surface or encapsulates the frame.

Aspect (27) pertains to the vehicle interior component of Aspect (25) or Aspect (26), wherein the polydimethylsiloxane is disposed in the opening.

Aspect (28) pertains the vehicle interior component of Aspect (27), wherein the polydimethylsiloxane is disposed on at least a portion of a rear surface of the frame, the opening extending through the frame from the support surface to the rear surface.

Aspect (29) pertains to the vehicle interior component of any one of Aspects (1) through (24), wherein the thickness of the glass substrate is from about 0.05 mm to about 2 mm.

Aspect (30) pertains to the vehicle interior component of any one of Aspects (1) through (29), wherein the thickness of the glass substrate is from about 0.3 mm to about 1.1 mm.

Aspect (31) pertains to the vehicle interior component of any one of Aspects (1) through (30), wherein the thickness of the glass substrate is less than about 1.5 mm or less than about 1.0 mm.

Aspect (32) pertains to the vehicle interior component of any one of Aspects (1) through (31), wherein the thickness of the glass substrate is from about 0.3 mm to about 0.7 mm.

Aspect (33) pertains to the vehicle interior component of any one of Aspects (1) through (32), wherein the thickness of the glass substrate is 0.4 mm.

Aspect (34) pertains to the vehicle interior component of any one of Aspects (1) through (33), wherein the glass is chemically strengthened.

Aspect (35) pertains to the vehicle interior component of any one of Aspects (1) through (33), further comprising a display module attached to the frame.

Aspect (36) pertains to the vehicle interior component of Aspect (35), wherein the display module is attached to the frame or the second major surface of the glass substrate using an optically clear adhesive.

Aspect (37) pertains to the vehicle interior component of any one of Aspects (1) through (36), wherein the frame comprises at least one of a polymer, metal, carbon fiber, or wood material.

Aspect (38) pertains to the vehicle interior component of Aspect (37), wherein the frame comprises an injection-molded polymer material.

Aspect (39) pertains to the vehicle interior component of any one of Aspects (1) through (38), further comprising a second adhesive disposed between the glass substrate and the support surface in one or more areas of the support surface where the opening is not formed.

Aspect (40) pertains to the vehicle interior component of Aspect (39), wherein the first adhesive is a curable adhesive, the second adhesive being configured to adhere the glass substrate to the support surface before the curable adhesive is cured.

Aspect (41) pertains to the vehicle interior component of Aspect (39) or Aspect (40), wherein the second adhesive is a pressure sensitive adhesive, an adhesive tape, an adhesive film, or a foam.

Aspect (42) pertains to the vehicle interior component of Aspect (41), wherein the second adhesive comprises at least one of an acrylic material, a urethane material, or an olefin rubber material.

Aspect (43) pertains to the vehicle interior component of any one of Aspects (39) through (42), wherein the support surface comprises one or more regions enclosed by the second adhesive with one or more openings being disposed in the one or more regions.

Aspect (44) pertains to the vehicle interior component of any one of Aspects (1) through (43), wherein the opening has a circular shape or a slotted shape.

Aspect (45) pertains to the vehicle interior component of Aspect (44), wherein the slotted shape comprises the first width of the opening and a first length of the opening, the first length being greater than the first width.

Aspect (46) pertains to the vehicle interior component of Aspect (45), wherein the first length is at least twice the first width, at least five-times the first width, or at least ten-times the first width.

Aspect (47) pertains to the vehicle interior component of any one of Aspects (1) through (46), further comprising a plurality of openings arranged on the support surface.

Aspect (48) pertains to the vehicle interior component of Aspect (47), wherein the plurality of openings is arranged in a predetermined pattern on the support surface based on a stress distribution of the glass substrate.

Aspect (49) pertains to the vehicle interior component of Aspect (48), wherein the predetermined pattern is based on regions of the glass substrate with stress that is high relative to stress in other regions of the glass substrate.

Aspect (50) pertains to a vehicle interior system comprising the vehicle interior component of any one of Aspects (1) through (49), and at least one of a decorative layer on one of the first and second major surfaces of the glass substrate, a display module, or a touch panel.

Aspect (51) pertains to the vehicle interior system of Aspect (50), wherein the vehicle interior system is at least one of a dashboard, a center console, an instrument cluster, a display, an infotainment module, a steering wheel, a touch panel, and an interior door panel.

Aspect (52) pertains to a method of cold-bending a glass substrate, comprising providing a frame comprising a support surface with one or more openings formed in the support surface; positioning a glass substrate on the support surface, the glass substrate comprising a first major surface, a second major surface facing the support surface, and a minor surface between the first and second major surfaces and defining a thickness of the glass substrate; applying a force to the glass substrate to conform the second major surface to the support surface while a temperature of the glass substrate is below the glass transition temperature of the glass substrate; and providing a first adhesive in contact with the second major surface and disposed within the one or more openings, wherein the first adhesive holds the second major surface in conformance with the support surface.

Aspect (53) pertains to the method of Aspect (52), wherein the first adhesive is disposed between the support surface and the glass substrate and disposed within the opening.

Aspect (54) pertains to the method of Aspect (52) or Aspect (53), wherein, when the second major surface is conformed to the support surface, at least one of the first major surface and the second major surface comprises at least one of a concave surface and a convex surface.

Aspect (55) pertains to the method of any one of Aspects (52) through (54), wherein, when the second major surface is conformed to the support surface, at least one of the first major surface and the second major surface comprises a compound curvature.

Aspect (56) pertains to the method of any one of Aspects (52) through (55), wherein, when the second major surface is conformed to the support surface, at least one of the first major surface and the second major surface is complexly curved.

Aspect (57) pertains to the method of any one of Aspects (52) through (56), wherein each of the one or more openings comprises a retaining feature.

Aspect (58) pertains to the method of Aspect (57), wherein the retaining feature comprises a first portion of the opening comprising a first width in a first direction and a second portion of the opening comprising a second width in the first direction, the second width being different than the first width, wherein the first portion is disposed between the second portion and the support surface, and wherein the first adhesive is disposed in the first portion and the second portion of the opening.

Aspect (59) pertains to the method of Aspect (58), wherein the second width is greater than the first width.

Aspect (60) pertains to the method of Aspect (58) or Aspect (59), wherein the first portion has a first shape defined by a first interior wall of the opening, and the second portion has a second shape defined by a second interior wall of the opening, the first shape being different in size or shape than the second shape.

Aspect (61) pertains to the method of any one of Aspects (57) through (60), wherein the retaining feature exerts a force on the first adhesive that opposes an elastic force in the glass substrate to hold the glass substrate in a conformed state.

Aspect (62) pertains to the method of any one of Aspects (57) through (61), wherein the one or more openings extend through the support surface to a void behind the support surface such that the support surface separates the void from the glass substrate, and wherein the first adhesive is disposed in at least a portion of the void.

Aspect (63) pertains to the method of Aspect (62), wherein the portion of the void in which the first adhesive is disposed has a third width in the first direction that is larger than the first width of the opening.

Aspect (64) pertains to the method of any one of Aspects (52) through (63), wherein the one or more openings are formed in the support surface opposite to at least one of an edge region of the second major surface and a curved portion of the second major surface.

Aspect (65) pertains to the method of any one of Aspects (52) through (64), wherein the one or more openings are disposed opposite to one or more regions of the second major surface that comprises a bending-induced stress.

Aspect (66) pertains to the method of any one of Aspects (52) through (65), wherein the one or more openings are arranged in a predetermined pattern on the support surface based on a stress distribution of the glass substrate.

Aspect (67) pertains to the method of Aspect (66), wherein the predetermined pattern is based on regions of the glass substrate with stress that is high relative to stress in other regions of the glass substrate.

Aspect (68) pertains to the method of any one of Aspects (52) through (66), wherein the first adhesive comprises at least one of an epoxy, a silicone material, an acrylic, a cyanoacrylate, a urethane, or an epoxy acrylate.

Aspect (69) pertains to the method of any one of Aspects (52) through (68), wherein the first adhesive comprises polydimethylsiloxane, the method further comprising: exposing the polydimethylsiloxane and the second major surface of the glass substrate to a plasma environment prior to positioning the glass substrate on the support surface.

Aspect (70) pertains to the method of Aspect (69), further comprising plasma bonding the glass substrate to the polydimethylsiloxane after the polydimethylsiloxane and the second major surface are exposed to the plasma environment.

Aspect (71) pertains to the method of Aspect (70), wherein the plasma bonding occurs during the step of applying the force to the glass substrate to conform the second major surface to the support surface while the temperature of the glass substrate is below the glass transition temperature of the glass substrate.

Aspect (72) pertains to the method of Aspect (70), further comprising applying the polydimethylsiloxane to the support surface after plasma bonding the glass substrate to the polydimethylsiloxane.

Aspect (73) pertains to the method of any one of Aspects (69) through (72), wherein the polydimethylsiloxane is applied to the frame prior to exposing the polydimethylsiloxane to the plasma environment.

Aspect (74) pertains to the method of Aspect (73), wherein the polydimethylsiloxane covers the support surface and is disposed in the one or more openings.

Aspect (75) pertains to the method of Aspect (74), wherein the one or more openings extends through the frame from the support surface to a rear surface of the frame, and the polydimethylsiloxane is in contact with at least a portion of the rear surface.

Aspect (76) pertains to the method of any one of Aspects (52) through (75), wherein the polydimethylsiloxane comprises a curved surface substantially corresponding to a curved surface of the support surface.

Aspect (77) pertains to a vehicle interior system formed according to any one of Aspects (52) through (76).

Aspect (78) pertains to the vehicle interior system of Aspect (77), wherein the vehicle interior system is at least one of a dashboard, a center console, an instrument cluster, a display, an infotainment module, a steering wheel, a touch panel, and an interior door panel.

Aspect (79) pertains to a method of forming a vehicle interior component, comprising: providing a frame comprising a support surface comprising a curved surface and one or more openings formed in the support surface; providing a glass substrate comprising a first major surface, a second major surface opposite the first major surface, and a minor surface between the first and second major surfaces and defining a thickness of the glass substrate; conforming the second major surface to the support surface by applying a force to the glass substrate; providing a first adhesive in contact with the second major surface and disposed within the one or more openings, wherein the first adhesive engages a retaining feature within the one or more opening, the retaining feature being configured to exert a force on the first adhesive to oppose delamination of the glass substrate from the support surface.

Aspect (80) pertains to the method of Aspect (79), wherein the conforming of the second major surface is performed while a temperature of the glass substrate is below the glass transition temperature of the glass substrate.

Aspect (81) pertains to the method of Aspect (79) or Aspect (80), wherein the first adhesive holds the second major surface in conformance with the support surface.

Aspect (82) pertains to the method of any one of Aspects (79) through (81), wherein the retaining feature comprises a first portion of the opening comprising a first width in a first direction and a second portion of the opening comprising a second width in the first direction, the second width being different than the first width, wherein the first portion is disposed between the second portion and the support surface, and wherein the first adhesive is disposed in the first portion and the second portion of the opening.

Aspect (83) pertains to the method of Aspect (82), wherein the second width is greater than the first width.

Aspect (84) pertains to the method of any one of Aspects (79) through (81), wherein the retaining feature comprises a rear surface of the frame, the one or more openings extending through the frame from the support surface to the rear surface, and the first adhesive being in contact with at least a portion of the rear surface.

Aspect (85) pertains to the method of Aspect (84), wherein the first adhesive is in contact with a region on the rear surface surrounding each of the one or more openings, the region having a diameter greater than a diameter of the opening on at least one of the rear surface and the support surface.

Aspect (86) pertains to a method of cold-bending a cover glass to a curved frame, the method comprising: providing a polydimethylsiloxane structure comprising a base with a primary surface and one or more raised portions; providing a structural frame comprising a front surface, a rear surface opposite to the front surface, and one or more through-holes extending from the front surface to the rear surface, the through-holes being sized to allow the raised portions to be inserted into the through-holes; attaching the polydimethylsiloxane structure to the structural frame by inserting the one or more raised portions into the one or more through-holes, the primary surface substantially conforming to a shape of the front surface; providing a glass substrate comprising a first major surface, a second major surface facing the support surface, and a minor surface between the first and second major surfaces and defining a thickness of the glass substrate; exposing the primary surface of the polydimethylsiloxane structure and the second major surface of the glass substrate to a plasma environment; and plasma-bonding the second major surface to the primary surface of the polydimethylsiloxane structure.

Aspect (87) pertains to the method of Aspect (86), further comprising: applying a polydimethylsiloxane layer to the rear surface of the frame; and plasma-bonding the polydimethylsiloxane layer to the one or more raised portions of the polydimethylsiloxane structure to secure the polydimethylsiloxane structure to the structural frame.

Aspect (88) pertains to the method of Aspect (86) or Aspect (87), wherein, during the plasma-bonding of the second major surface to the primary surface of the polydimethylsiloxane structure, the glass substrate has a temperature below the glass transition temperature of the glass substrate.

Aspect (89) pertains to the method of any one of Aspects (86) through (88), wherein the front surface of the structural frame comprises one or more curved portions, and the glass substrate conforms to the one or more curved portions, so that the first major surface of the glass substrate comprises one or more curved portions.

Aspect (90) pertains to the method of any one of Aspects (86) through (89), wherein the polydimethylsiloxane structure comprises one or more bolt-shaped polydimethylsiloxane structures for each of the one or more openings.

Aspect (91) pertains to the method of Aspect (79), further comprising inserting the one or more bolt-shaped polydimethylsiloxane structures into a flexible washer plate.

Aspect (92) pertains to the method of Aspect (91), further comprising encapsulating the flexible washer plate and at least a portion of the bolt-shaped polydimethylsiloxane structures in a polydimethylsiloxane encapsulation layer.

Aspect (93) pertains to the method of Aspect (91) or Aspect (92), further comprising securing the bolt-shaped polydimethylsiloxane structures to the structural frame with a washer and/or nut.

Aspect (94) pertains to a vehicle interior component comprising: a frame comprising a support surface, a rear surface opposite to the front surface, and one or more openings formed in the support surface; a glass substrate comprising a first major surface, a second major surface facing the support surface, and a minor surface between the first and second major surfaces and defining a thickness of the glass substrate; and a bonding layer between the glass substrate and the frame, the bonding layer configured to adhere the glass substrate to the frame, wherein the bonding layer is disposed on the support surface, in the one or more openings, and on at least a portion of the rear surface.

Aspect (95) pertains to the vehicle interior component of Aspect (94), wherein the bonding layer comprises at least one of an epoxy, a silicone material, an acrylic, a cyanoacrylate, a urethane, an epoxy acrylate, or polydimethylsiloxane.

Aspect (96) pertains to the vehicle interior component of Aspect (95), wherein the bonding layer optionally comprises polydimethylsiloxane, and wherein the bonding layer is plasma-bonded to the second major surface of the glass substrate.

Aspect (97) pertains to the vehicle interior component of Aspect (96), wherein the bonding layer comprises a first layer that is disposed on the support surface and is plasma-bonded to the second major surface, and a second layer that it disposed on at least a portion of the rear surface, wherein one of the first layer and the second layer is disposed in the one or more openings, and wherein the first layer is plasma bonded to the second layer.

Aspect (98) pertains to the vehicle interior component of Aspect (97), wherein one of the first layer and the second layer comprises a base layer in contact with the front or rear surface of the frame, and one or more raised portions configured to pass at least partially through the one or more openings.

Aspect (99) pertains to the vehicle interior component of any one of Aspects (95) through (98), wherein the bonding layer encapsulates the frame.

Aspect (100) pertains to the vehicle interior component of any one of Aspects (94) through (99), wherein the support surface comprises a curved support surface.

Aspect (101) pertains to the vehicle interior component of any one of Aspects (94) through (100), wherein the glass substrate is cold-formed onto the bonding layer to conform to a shape of the support surface.

Aspect (102) pertains to a vehicle interior component comprising: a frame comprising a curved support surface, a rear surface opposite to the front surface, and one or more openings formed in the curved support surface; a glass substrate comprising a first major surface, a second major surface facing the curved support surface, and a minor surface between the first and second major surfaces and defining a thickness of the glass substrate; a bonding layer between the glass substrate and the frame, the bonding layer configured to adhere the glass substrate to the frame, a plurality of bolts comprising a first portion having a first width and a second portion having a second width, the first width being larger than a width of the one or more openings, and the second width being less than the first width and equal to or less than the width of the one or more openings, wherein at least the first portion of the plurality of bolts is encapsulated in the bonding layer, wherein the second portion of the plurality of bolts extends through the one or more openings to the rear surface, an end of the second portion being secured behind the rear surface with one or more fasteners or nuts, and wherein the glass substrate is plasma-bonded to the bonding layer.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A vehicle interior component comprising:
   a frame comprising a curved support surface and an opening formed in the curved support surface;
   a glass substrate comprising a first major surface, a second major surface facing the support surface, and a minor surface between the first and second major surfaces and defining a thickness of the glass substrate, wherein the thickness is in a range from 0.5 mm to 1.5 mm; wherein the second major surface comprises a curved substrate surface in conformance with the curved support surface, and wherein the curved support surface comprises a first radius of curvature and the curved substrate surface comprises a second radius of curvature that is from 20 mm to 10,000 mm and within 10% of the first radius of curvature, wherein the glass substrate is a cold-formed glass substrate; and
   a first adhesive at least partially disposed in the opening and adhering the glass substrate to the frame,
   wherein the first adhesive and the opening are configured to act in concert to prevent delamination of the vehicle interior component and to oppose elastic forces present in the glass substrate from the glass substrate being cold-formed and prevent the glass substrate from returning to an un-bent state.

2. The vehicle interior component of claim 1, wherein the opening extends through the support surface to a void behind the support surface such that the support surface separates the void from the glass substrate, and
   wherein the first adhesive is disposed in at least a portion of the void.

3. The vehicle interior component of claim 1, wherein the opening is disposed opposite to at least one of an edge region of the second major surface and a curved portion of the second major surface.

4. The vehicle interior component of claim 1, wherein the opening is disposed opposite to a region of the second major surface that comprises a bending-induced stress.

5. The vehicle interior component of claim 1, wherein the first adhesive comprises at least one of an epoxy, a silicone material, an acrylic, a cyanoacrylate, a urethane, or an epoxy acrylate.

6. The vehicle interior component of claim 1, wherein the opening does not extend to a rear surface of the frame opposite to the curved support surface.

7. The vehicle interior component of claim 1, wherein the glass is chemically strengthened.

8. The vehicle interior component of claim 1, further comprising a display module attached to the frame.

9. A vehicle interior system comprising the vehicle interior component of claim 1, and a decorative layer on one of the first and second major surfaces of the glass substrate.

10. The vehicle interior system of claim 9, wherein the vehicle interior system is at least one of a dashboard, a center console, an instrument cluster, a display, an infotainment module, a steering wheel, a touch panel, and an interior door panel.

11. A vehicle interior component comprising:
    a frame comprising a support surface, a rear surface opposite to the support surface, and one or more openings formed in the support surface;
    a glass substrate comprising a first major surface, a second major surface facing the support surface, and a minor surface between the first and second major surfaces and defining a thickness of the glass substrate, wherein the thickness is in a range from 0.5 mm to 1.5 mm; and
    a bonding layer between the glass substrate and the frame, the bonding layer configured to adhere the glass substrate to the frame,
    wherein the bonding layer is disposed on the support surface, in the one or more openings, and on at least a portion of the rear surface,
    wherein the glass substrate is cold-formed onto the bonding layer to conform to a shape of the support surface such that the second major surface comprises a radius of curvature that is from 20 mm to 10,000 mm, wherein the bonding layer is configured to oppose elastic forces present in the glass substrate from the glass sibstrate being cold-formed and prevent the glass substrate from returning to an un-bent state.

12. The vehicle interior component of claim 11, wherein the bonding layer comprises at least one of an epoxy, a silicone material, an acrylic, a cyanoacrylate, a urethane, an epoxy acrylate, or polydimethylsiloxane.

13. The vehicle interior component of claim 12, wherein the bonding layer optionally comprises polydimethylsiloxane and wherein, when the bonding layer comprises polydimethylsiloxane, the bonding layer is plasma-bonded to the second major surface of the glass substrate.

14. The vehicle interior component of claim 11, wherein the support surface comprises a curved support surface.

* * * * *